(12) United States Patent
Kuroda et al.

(10) Patent No.: US 7,139,460 B2
(45) Date of Patent: Nov. 21, 2006

(54) OPTICAL ELEMENT, METHOD OF PRODUCING OPTICAL ELEMENTS, COATING DEVICE, AND COATING METHOD

(75) Inventors: Toshihiro Kuroda, Ibaraki (JP); Madoka Kondou, Ibaraki (JP); Atsushi Yoshino, Ibaraki (JP); Nobuo Miyadera, Ibaraki (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 0 days.

(21) Appl. No.: 10/479,150

(22) PCT Filed: May 30, 2002

(86) PCT No.: PCT/JP02/05289

§ 371 (c)(1),
(2), (4) Date: Apr. 30, 2004

(87) PCT Pub. No.: WO02/097492

PCT Pub. Date: Dec. 5, 2003

(65) Prior Publication Data
US 2004/0234222 A1    Nov. 25, 2004

(30) Foreign Application Priority Data
May 30, 2001   (JP)   ............................. 2001-163222

(51) Int. Cl.
*G02B 6/10*  (2006.01)
(52) U.S. Cl. ............ 385/129; 385/131; 385/144; 385/145
(58) Field of Classification Search ................ 385/14, 385/129–132, 88, 141–145
See application file for complete search history.

(56) References Cited

U.S. PATENT DOCUMENTS

| 6,316,281 B1 * | 11/2001 | Lee et al. ................... 438/31 |
| 6,613,184 B1 * | 9/2003 | Egitto et al. ................ 156/314 |
| 6,810,189 B1 * | 10/2004 | Ido et al. .................... 385/129 |
| 2003/0054184 A1 * | 3/2003 | Miyadera et al. .......... 428/473.5 |

FOREIGN PATENT DOCUMENTS

JP            56131949 A    * 10/1981

(Continued)

OTHER PUBLICATIONS

Japanese Office Action for Application No. 2003-500616, dispatched Mar. 15, 2005, and English translation thereof (9 pp.).

*Primary Examiner*—Sung Pak
*Assistant Examiner*—Omar Rojas
(74) *Attorney, Agent, or Firm*—Antonelli, Terry, Stout and Kraus, LLP.

(57) ABSTRACT

A method of producing optical elements using a substrate having a recess, which is capable of easily removing a film in the recess, and optical elements formed. The optical element comprises a substrate 1, an optical waveguide structure layer 10 of resin disposed in a part of the region on the substrate 1, and a recess 21 formed in the region where the optical waveguide structure layer 10 is not disposed. The optical waveguide structure layer 10 includes an optical waveguide 4 and a clad layer. A coupler layer is disposed between the substrate 1 and the optical waveguide structure layer 10, and the film thickness distribution range of the coupler layer in the region below the optical waveguide 4 is such that the minimum film thickness is not more than 30 angstroms and the maximum film thickness is not less than 20 angstroms.

10 Claims, 12 Drawing Sheets

FOREIGN PATENT DOCUMENTS

| | | |
|---|---|---|
| JP | 7-174930 | 7/1995 |
| JP | 2000-241640 | 9/2000 |
| JP | 2001-100055 | 4/2001 |

* cited by examiner

A-A' SECTIONAL VIEW

B-B' SECTIONAL VIEW

FIG.8
(a)
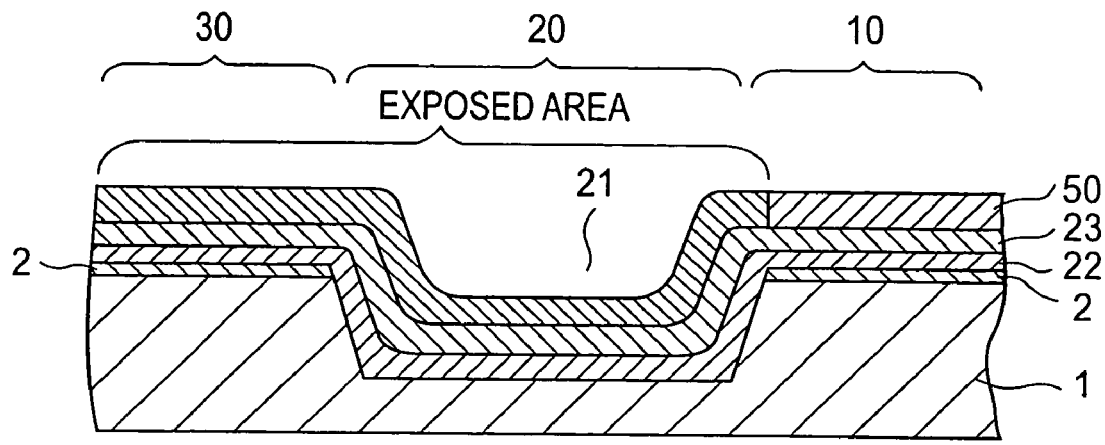
(b)
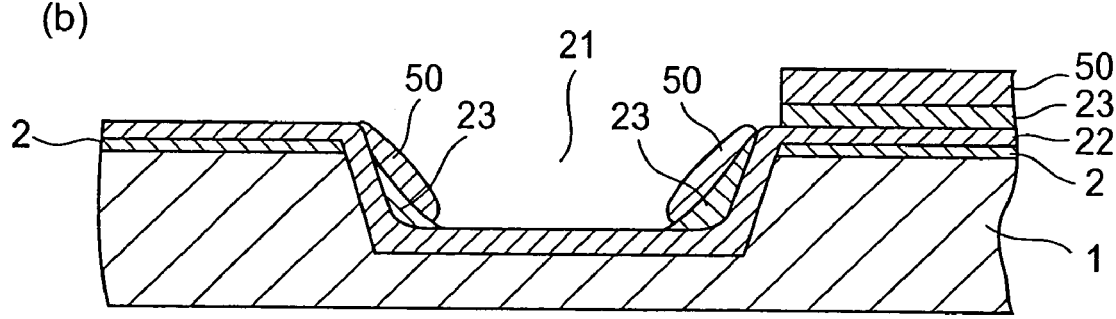
(c)
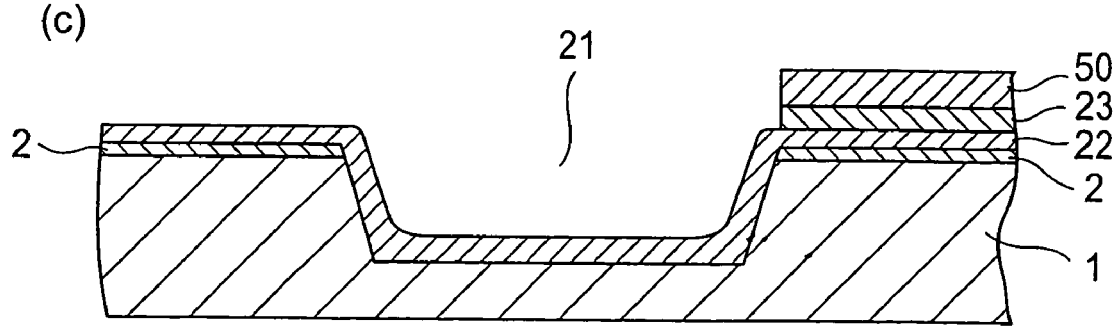

FIG. 13 COMPARATIVE EXAMPLE
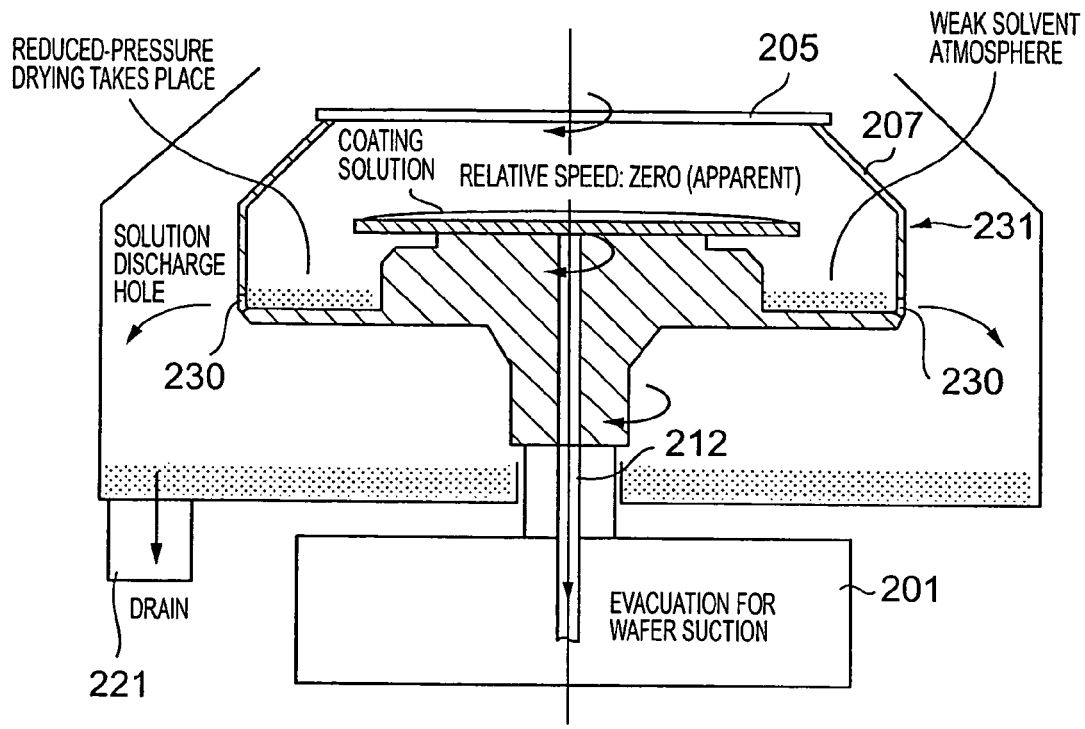
FIG. 14 COMPARATIVE EXAMPLE
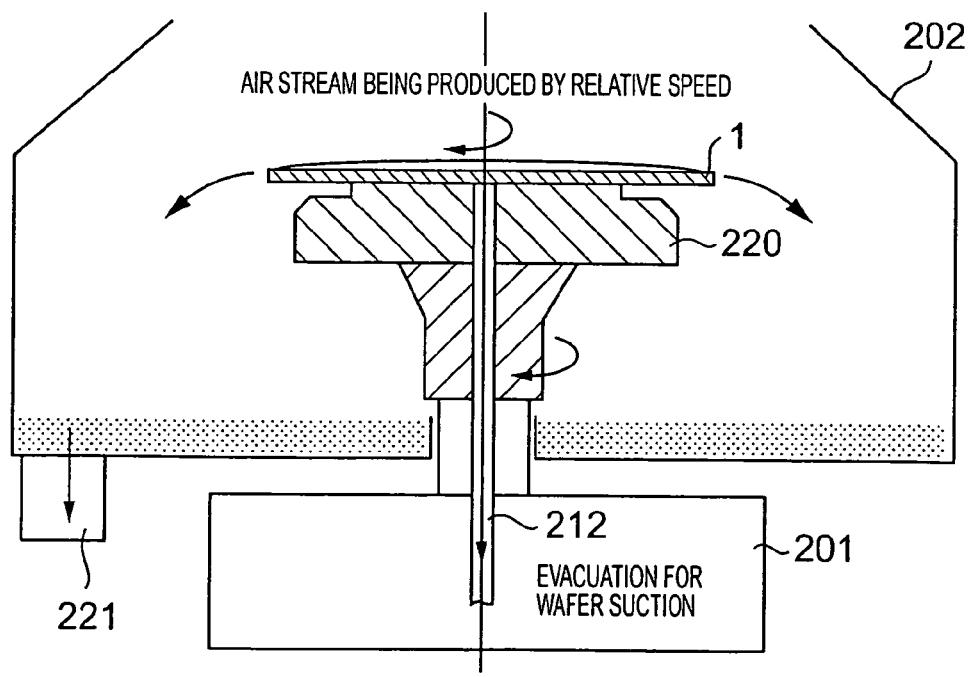

FIG.15
(a)
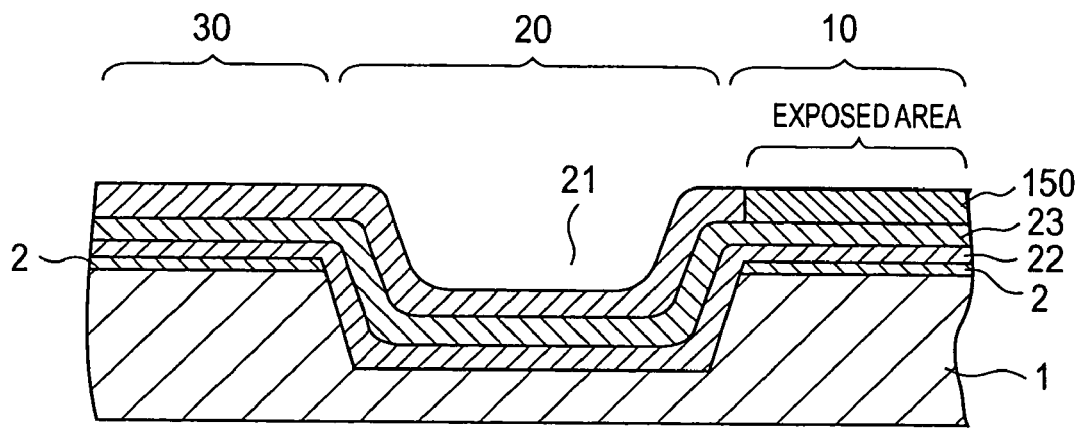
(b)
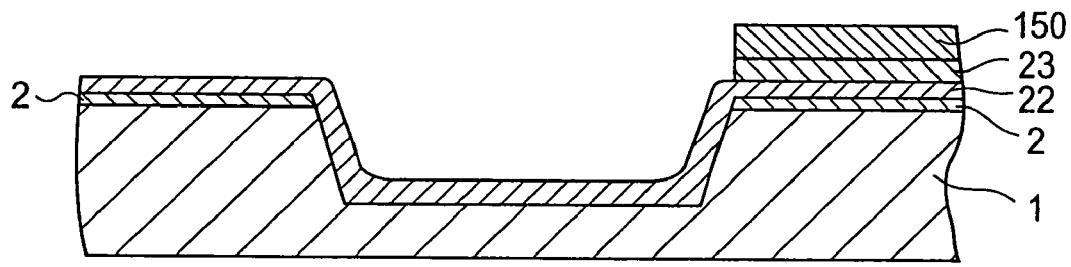
(c)
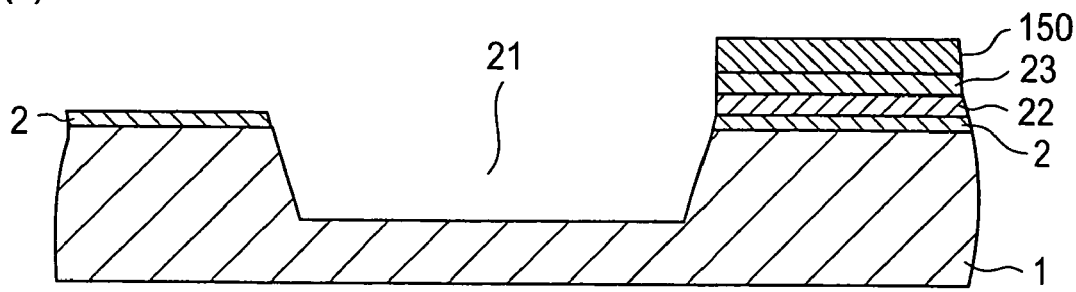

A-A' SECTIONAL VIEW

OPTICAL ELEMENT, METHOD OF PRODUCING OPTICAL ELEMENTS, COATING DEVICE, AND COATING METHOD

TECHNICAL FIELD

This invention relates to a process for producing an optical element made of a resin.

BACKGROUND ART

Polyimide type resins attract notice as materials with use of which optical elements such as optical waveguides having good optical characteristics can be produced by a simple production process. Polyimide type resins have a high glass transition temperature (Tg) and a superior heat resistance, and hence optical elements produced are expected to have a long-term reliability, and further, even though they are made of resins, can withstand soldering. In particular, a polyimide type resin containing fluorine has characteristic features such that it has higher light transmission properties and a lower refractive index than polyimide type resins containing no fluorine, and hence it is superior thereto as a material for optical elements.

Such a polyimide type resin containing fluorine, however, has low adherence to glass, quartz, silicon, silicon oxide, silicon nitride, aluminum, aluminum oxide, aluminum nitride, tantalum oxide, gallium arsenide and so forth which are used as materials for substrates of optical elements. Accordingly, an optical-device production method is disclosed in Japanese Patent Application Laid-open No. H7-174930 in which an organozirconium compound layer is formed on a substrate and a polyimide type resin film containing fluorine is formed thereon. Also disclosed in Japanese Patent Application Laid-open No. 2000-241640 is a structure in which a film of an organozirconium compound and a resin film containing no fluorine are superposingly formed and a polyimide type resin film containing fluorine is formed thereon.

DISCLOSURE OF THE INVENTION

As stated above, in order to form on a substrate a polyimide type resin film containing fluorine which has superior optical characteristics, a film of an organozirconium compound and a resin film containing no fluorine are conventionally used as bonding layers. These bonding layers have a problem that any too thin layer can not exhibit the action to improve adherence and on the other hand any too thick layer makes the bonding layer itself brittle.

Meanwhile, as in the case of, e.g., optical elements used in optical communication, in order to facilitate the alignment of optical fibers with optical elements, the optical elements used to be connected to the optical fibers can be so structured as to have in each optical element a recess such as a V-groove on which an optical fiber is mounted. Where spin coating is used to form a bonding layer on a substrate having such a recess, a bonding layer material solution having accumulated inside the recess is forced outside by centrifugal force. Hence, depending on the properties of the bonding layer material solution, a problem may arise such that the film thickness tends to have a large distribution. Such large distribution of film thickness tends to cause a problem that the action to improve adherence can not be attained at the part having too small film thickness and the bonding layer is brittle at the part having too large film thickness.

It is an object of the present invention to provide an optical element having an optical-waveguide structure layer made of a resin, and an optical element having superior adherence between the substrate and the optical-waveguide structure layer.

To achieve the above object, the present invention provides an optical element described below.

The optical element of the present invention comprises a substrate and disposed thereon an optical-waveguide structure layer made of a resin. A coupler layer is disposed between the substrate and the optical-waveguide structure layer. The coupler layer has, in the region beneath the optical waveguide embraced in the optical-waveguide structure layer, a film thickness distribution which is so made as to be in the range of from a minimum film thickness of 30 angstroms or more to a maximum film thickness of 200 angstroms or less.

In this optical element, an organometallic compound layer may be used as the coupler layer. For example, an organoaluminum compound layer may be used. An organozirconium compound layer may also be used as the coupler layer, where it may preferably have, in the region beneath the optical waveguide, a film thickness distribution in the range of from a minimum film thickness of 50 angstroms or more to a maximum film thickness of 150 angstroms or less.

In this optical element, the optical-waveguide structure layer may be so made up that it is formed of a resin material containing fluorine and a resin layer containing no fluorine is disposed between the coupler layer and the optical-waveguide structure layer.

The above organozirconium compound layer may also be formed through, e.g., a coating step in which the substrate is disposed in an solvent atmosphere, in the state of which the substrate is coated thereon with a solution containing the organozirconium compound and a solvent. The solvent constituting the solvent atmosphere may be the same as the solvent contained in the solution.

BRIEF DESCRIPTION OF THE DRAWINGS

FIGS. 8(a) to (c) are illustrations showing the steps of removing a first coupler layer 22 and a second coupler layer 23 both in a V-groove 21, in the process for producing optical elements 100 in Second Embodiment of the present invention.

FIG. 13 is an illustration showing a structure wherein a spin coater of a comparative example is being rotated.

FIG. 14 is an illustration showing a structure wherein a spin coater of a comparative example is being rotated.

FIGS. 15(a) to (c) are illustrations showing the steps of removing a first coupler layer 22 and a second coupler layer 23 both in a V-groove 21, in the process for producing optical elements 100 in First Embodiment of the present invention.

Figure 1:
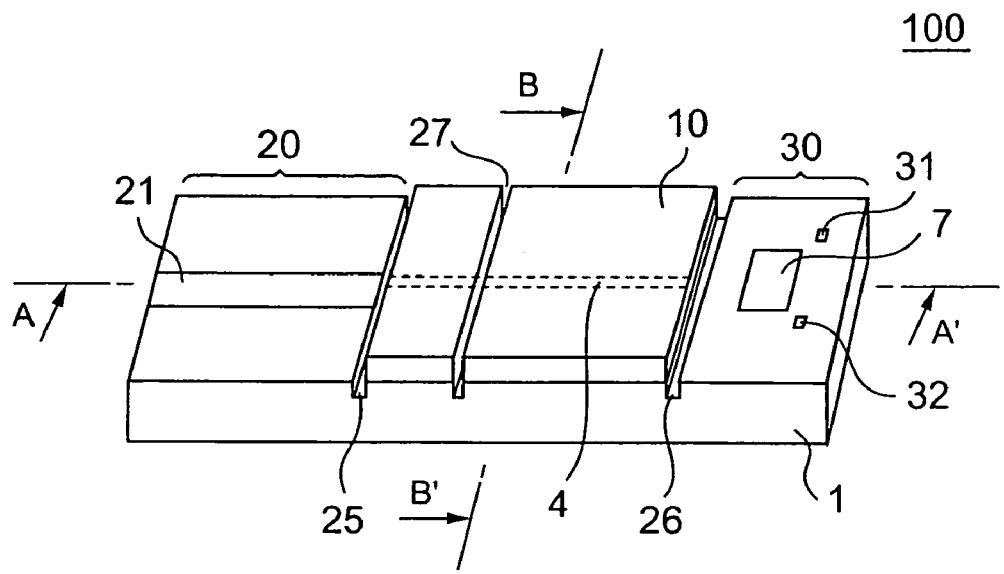
FIG. 1 is a perspective view showing the structure of an optical element 100 in First and Second Embodiments of the present invention.

BEST MODES FOR PRACTICING THE INVENTION (Fist Embodiment)

First, the structure of an optical element 100 according to a first embodiment of the present invention is described with reference to FIGS. 1 to 4. The optical element 100 has a silicon single-crystal substrate 1, and provided thereon a region in which an optical-waveguide multi-layer member 10 has been mounted on the silicon single-crystal substrate 1, a region 20 in which a V-groove 21 has been disposed, and a region 30 in which an electrode 7 on which a light-emitting element or a light-receiving element is to be mounted. The optical-waveguide multi-layer member 10 embraces an optical waveguide 4, and the V-groove 21 is a groove to which an optical fiber is to be mounted. As to the V-groove 21, its depth and width are so designed that it stands in alignment with the optical waveguide 4 when an optical fiber with a predetermined diameter is mounted. Hence, e.g., the light-emitting element is mounted on the electrode 7 and the optical fiber is mounted to the V-groove 21, whereby the light emitted from the light-emitting element can be made to enter the optical waveguide 4 to allow the light to be propagated therethrough and enter the optical fiber in a high efficiency. Also, where the light-receiving element is mounted on the electrode 7, the light having come propagated through the optical fiber can be made to enter the optical waveguide 4 in a high efficiency to allow the light to be propagated through the optical waveguide 4 and make it emergent to the light-receiving element in a good accuracy.

Figure 3:
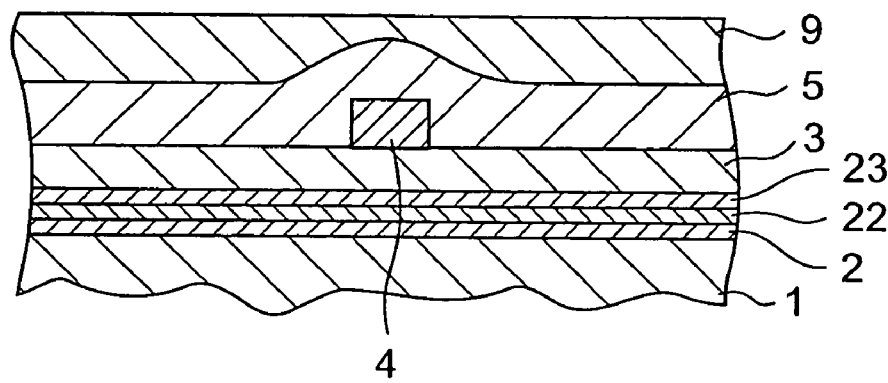
FIG. 3 is a sectional view of the optical element along the line B–B' in FIG. 1.

On the top surface of the substrate 1, a silicon dioxide layer 2 is provided which is to protect the substrate 1 and control refractive indexes, and the optical-waveguide multi-layer member 10 is mounted on the silicon dioxide layer 2. The optical-waveguide multi-layer member 10 comprises, as shown in FIG. 3, a first coupler layer 22, a second coupler layer 23, a lower clad layer 3, the optical waveguide 4, an upper clad layer 5 in which the optical waveguide 4 is buried, and a protective layer 9, which are multi-layered in this order on the silicon dioxide layer 2. The first coupler layer 22 is a coupler layer containing an organometallic compound, and the second coupler layer 23 is a coupler layer containing no organometallic compound. The lower clad layer 3, the optical waveguide 4 and the upper clad layer 5 are all formed of a polyimide type resin containing fluorine, having superior optical characteristics. The first coupler layer 22 and the second coupler layer 23 are disposed in order to enhance the adherence between the substrate 1 and the lower clad layer 3.

As the organometallic compound constituting the first coupler layer 22, various compounds may be used as described later. In First Embodiment, an organoaluminum compound layer is used as the first coupler layer 22. As the organoaluminum compound, here is used aluminum acetylacetonate. The first coupler layer 22 is so formed that it has, at least in the region beneath the optical waveguide 4, a film thickness distribution of from a minimum film thickness of 30 angstroms or more to a maximum film thickness of 200 angstroms or less.

The second coupler layer 23 is, in First Embodiment, a polyimide type resin film containing no fluorine. Here, it is a polyimide layer formed using PIQ (trade name), available from Hitachi Chemical Co., Ltd. It has a film thickness of about 0.23 µm.

The lower clad layer 3 and the upper clad layer 5 are here each a polyimide film containing fluorine, formed using OPI-N3105 (trade name), available from Hitachi Chemical Co., Ltd. The lower clad layer 3 has a film thickness of about 6 µm. The upper clad layer 5 has a film thickness of about 10 µm at its part just above the optical waveguide 4, and about 15 µm at the part other than that. The optical waveguide 4 is composed of a polyimide film containing fluorine, formed using OPI-N3305 (trade name), available from Hitachi Chemical Co., Ltd. It has a film thickness of about 6.5 µm. The protective layer 9 is a polyimide film formed using PIX-6400 (trade name), available from Hitachi Chemical Du Pont Microsystems Co., Ltd. It has a film thickness of about 5 µm at its end part distant from the optical waveguide 4.

In the optical-waveguide multi-layer member 10, a notch 27 is also so formed that it crosses the optical waveguide 4. To this notch 27, a filter such as a wavelength selection filter or a polarized-light filter may be inserted through which the light propagated through the optical waveguide 4 is made to pass. The notch 27 has a notch angle which is perpendicular to the main plane of the substrate 1 as viewed in FIG. 1. It may also have an angle at which it inclines in respect to the main plane of the substrate 1.

Figure 2:
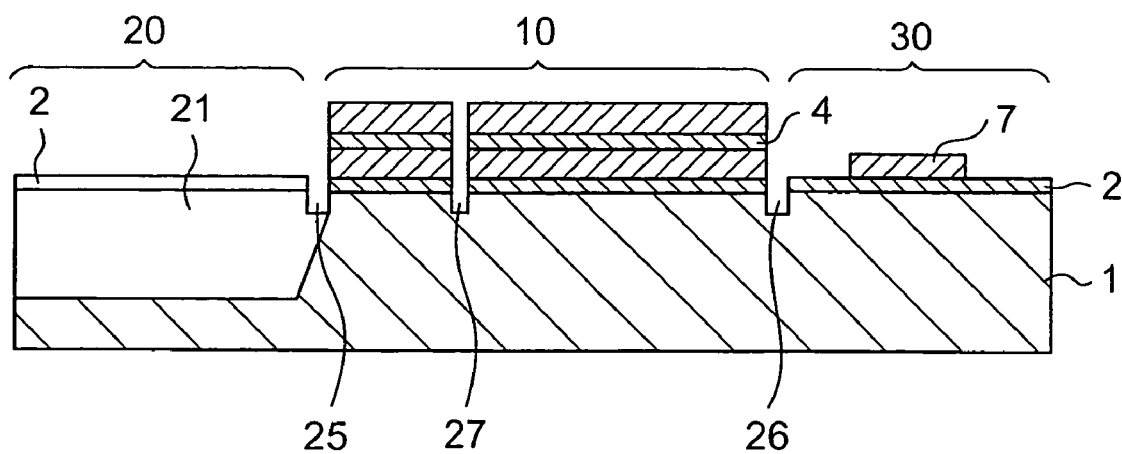
FIG. 2 is a sectional view of the optical element along the line A–A' in FIG. 1.
Figure 16:
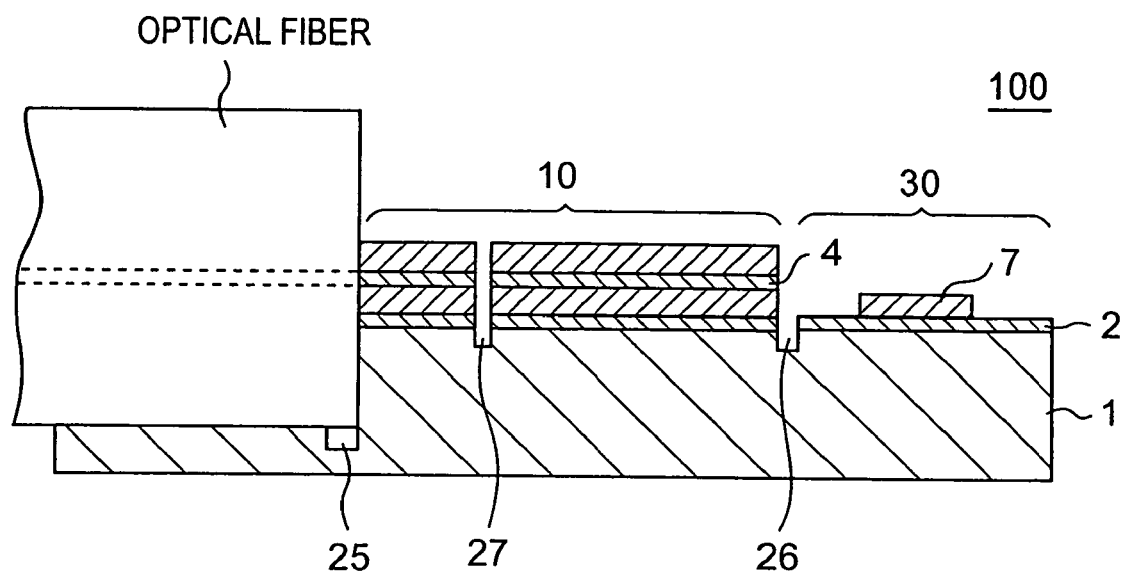
FIG. 16 is a sectional view along the line A–A' in FIG. 1, of a structure wherein a notch 25 of the optical element is formed in a large depth of cut.

The V-groove 21 is a groove of about 100 µm in depth which has been formed by subjecting the silicon single-crystal substrate 1 to anisotropic etching, and has substantially a V-shaped cross section. At the boundary between the region 20 in which the V-groove 21 has been disposed and the optical-waveguide multi-layer member 10, a notch 25 formed when an end of the optical-waveguide multi-layer member 10 is cut is present as shown in FIGS. 1, 2 and 3. Similarly, a notch 26 is also present at the boundary between the region 30 of the electrode 7 and the optical-waveguide multi-layer member 10. Incidentally, the notch depth of the notch 25 may preferably be in such an extent that, as shown in FIG. 16, the leading end of an optical fiber does not come into contact with the inclined part of the V-groove 21 on the region 10 side when the optical fiber is mounted to the V-groove 21. A registration mark 33 is also disposed at the bottom of the notch 25, and registration marks 31 and 32 on both sides of the electrode 7 in the region 30. These registration marks 31, 32 and 33 are recesses formed by anisotropic etching simultaneously in forming the V-groove 21.

A process for producing optical elements according to this Embodiment is described below with reference to FIG. 5.

Here, a silicon wafer is made ready for use as the substrate 1. The structure shown in FIG. 1 is so formed on this substrate 1 as to be crosswise arranged in a large number. In a post step, the structures formed are cut off by dicing to separate them into individual optical elements 100. This enables mass production of a large number of optical elements 100 shown in FIG. 1. Accordingly, film formation and patterning are carried out at a time on the whole wafer-shaped substrate 1.

Figure 4:
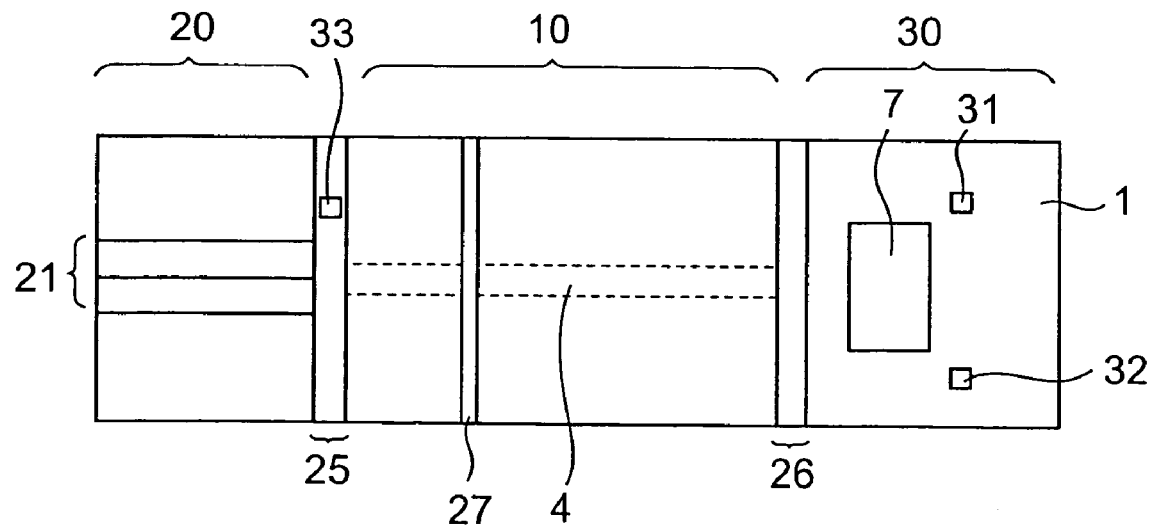
FIG. 4 is a top view of the optical element shown in FIG. 1.

First, on the whole top surface of the wafer-shaped substrate 1, the silicon dioxide layer 2 is formed by thermal oxidation or gaseous-phase deposition. Thereafter, V-grooves 21 are formed in arrangement as shown in FIG. 5, by photolithography and wet etching utilizing anisotropy of the silicon single crystal. Here, recesses used as the registration marks 31, 32 and 33 shown in FIG. 4 are also previously formed at the same time the V-grooves 21 are formed.

A metal film is formed on this wafer-shaped substrate 1, followed by patterning to form each electrode 7 shown in FIG. 1. Thus, as shown in FIG. 5, V-grooves 21 and electrodes 7 are formed in arrangement in a large number on the wafer-shaped substrate 1. Incidentally, the patterning of the metal layer is carried out by vacuum deposition or the like using a resist pattern layer as a mask. When this resist pattern layer is exposed to light, a photomask may be registered using the registration marks 31, 32 and 33 formed previously at the same time the V-grooves 21 are formed. Thus, electrodes 7 can be obtained which have accurately been registered to the V-grooves 21.

Figure 5:
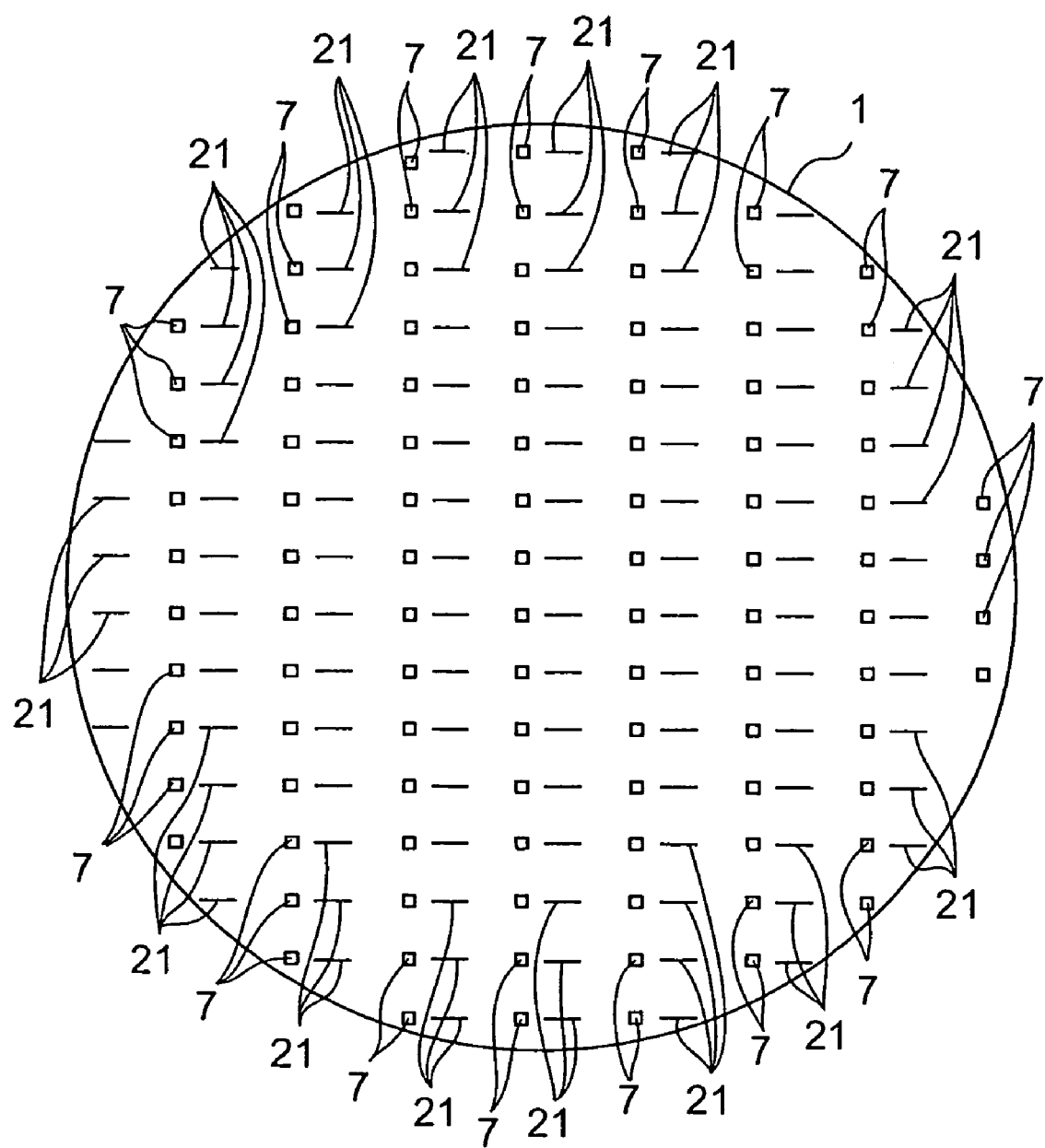
FIG. 5 is a top view of a wafer-shaped substrate, for describing a process for producing optical elements 100 in First and Second Embodiments of the present invention.

Next, on the whole wafer-shaped substrate 1 shown in FIG. 5, the first coupler layer 22 is formed by spin coating. First, as a material solution for the first coupler layer 22, a solution prepared by dissolving aluminum acetylacetonate in a solvent N-methyl-2-pyrrolidone is made ready for use. The substrate 1, on which this material solution has been dropped, is rotated by means of a commonly available spin coater to form a wet coating of the material solution. Thereafter, the wet coating formed is dried by heating it at 160° C. for about 5 minutes to form the first coupler layer 22. Thus, the first coupler layer 22 can be formed on the whole surface of the wafer-shaped substrate 1 shown in FIG. 5. The first coupler layer 22 is so formed that, after drying, at least in the region beneath the optical waveguide 4, the film thickness distribution of from a minimum film thickness of 30 angstroms or more to a maximum film thickness of 200 angstroms or less. Of course, the first coupler layer 22 may preferably be so formed that it has, not in the region beneath the optical waveguide 4 only, but in its entirety, the film thickness distribution of from a minimum film thickness of 30 angstroms or more to a maximum film thickness of 200 angstroms or less.

Figure 6:
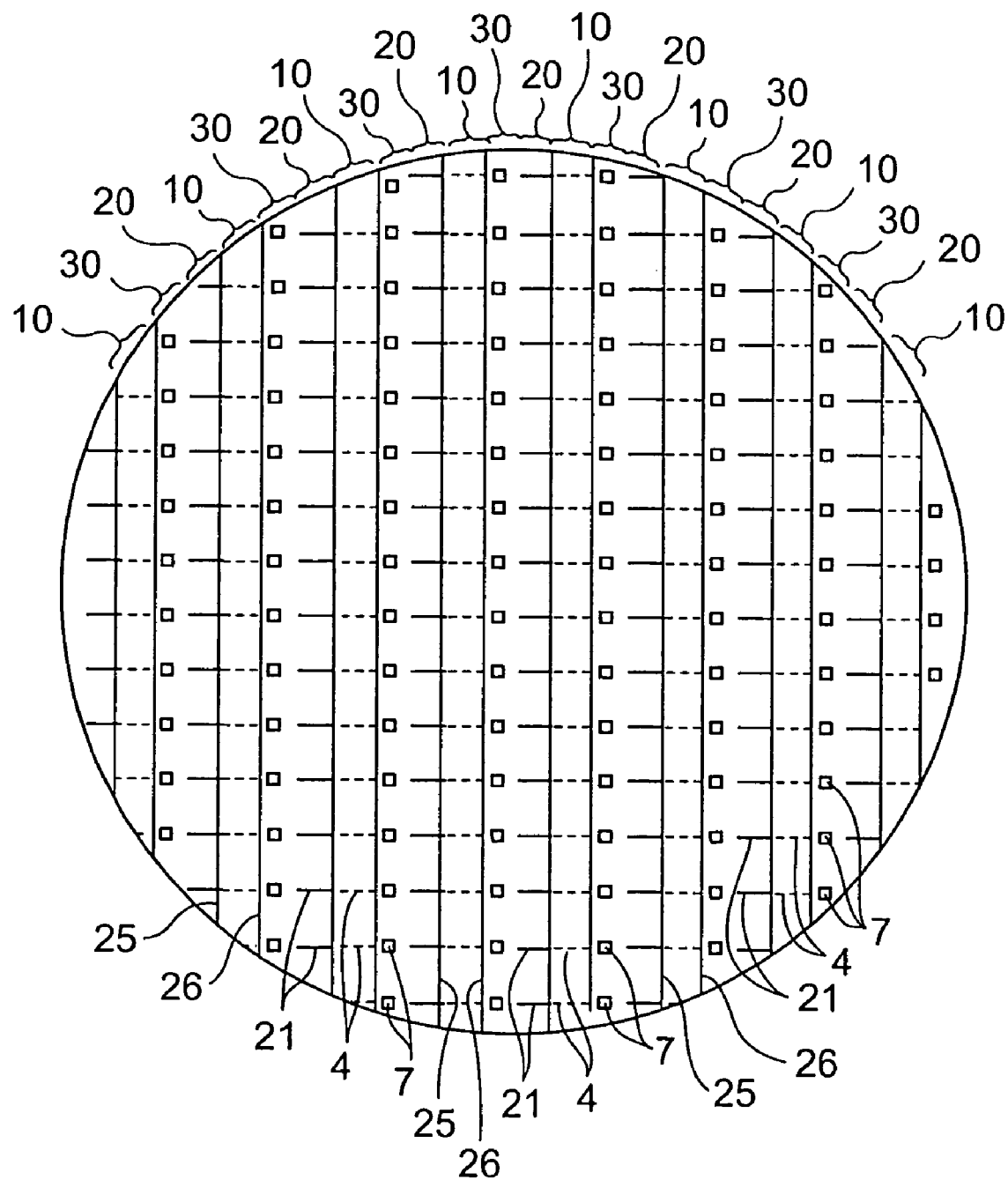
FIG. 6 is a top view of a wafer-shaped substrate, for describing a process for producing optical elements 100 in First and Second Embodiments of the present invention.

Next, the second coupler layer 23 and the first coupler layer 22 are removed from the top surface of the wafer-shaped substrate 1 at its part corresponding to the regions 20 and 30 where each optical-waveguide multi-layer member 10 is not disposed in the optical element having been completed. On the wafer-shaped substrate 1, optical elements are so produced as to be crosswise arranged, and hence the part corresponding to the regions 20 and 30 in the top surface of the wafer-shaped substrate 1 is, as shown in FIG. 6, beltlike zones on both sides of each optical-waveguide multi-layer member 10. Removing the second coupler layers 23 and first coupler layers 22 from these beltlike zones makes it easy for the lower clad layers 3 to be separated from the substrate 1 at these beltlike zones. This makes the second coupler layers 23 and first coupler layers 22 removable by peeling them in the form of belts from the part corresponding to the regions 20 and 30 in the step described later.

Next, the second coupler layer 23 and the first coupler layer 22 are removed from the top surface of the wafer-shaped substrate 1 at its part corresponding to the regions 20 and 30 where each optical-waveguide multi-layer member 10 is not disposed in the optical element having been completed. On the wafer-shaped substrate 1, optical elements are so produced as to be crosswise arranged, and hence the part corresponding to the regions 20 and 30 in the top surface of the wafer-shaped substrate 1 is, as shown in FIG. 6, beltlike zones on both sides of each optical-waveguide multi-layer member 10. Removing the second coupler layers 23 and first coupler layers 22 from these beltlike zones makes it easy for the lower clad layers 3 to be separated form the substrate 1 at these beltlike zones. This makes the optical-waveguide multi-layer members 10 removable by peeling them in the form of belts from the part corresponding to the regions 20 and 30 in the step described later.

A method by which the second coupler layers 23 and first coupler layers 22 are removed from the regions 20 and 30 on the substrate 1 is specifically described.

In order to remove the second coupler layers 23 and first coupler layers 22 only from the regions 20 and 30 on the substrate 1, one may contemplate disposing a resist film with which only the regions where the optical-waveguide multi-layer members 10 are disposed are covered, and etching the second coupler layers 23 and first coupler layers 22 on the regions 20 and 30. However, deep V-grooves 21 of 100 μm in depth each are present in the regions 20, and hence the light to which the resist is exposed tend to reflect irregularly at inner walls of the V-grooves 21, so that the light can not easily reach the bottoms and ends of the V-grooves 21. Hence, where a positive resist with which the portions exposed to light dissolve at the time of development, the resist tends to remain at the bottoms and ends of the V-grooves 21. If the resist remains at the bottoms and ends of the V-grooves 21, the second coupler layers 23 and first coupler layers 22 can not be removed at the time of etching. Accordingly, in this Embodiment, a negative resist is used to remove the second coupler layers 23 and first coupler layers 22 from the regions 20 where deep V-grooves 21 are present.

First, as shown in FIG. 15(a), a negative resist film 150 is formed on the whole surface of the wafer-shaped substrate 1 by coating. Here, as a fluid negative resist, ZPN-1100 (available from ZEON Corporation) is used, and this is spin-coated, followed by drying at 100° C. to form the negative resist film 150. Thereafter, the negative resist film 150 is exposed through a photomask by irradiating it by light emitted from a mercury lamp. The photomask is so patterned that only the part where the optical-waveguide multi-layer members 10 are to be formed is irradiated by light. Thus, only the resist film 150 at its part where the optical-waveguide multi-layer members 10 are to be formed are exposed to cause photoreaction to change into a resin insoluble in the developing solution. More specifically, the resist film 150 at the part of the V-grooves 21 is not exposed, and hence the problem does not rise such that the light for exposure reflects irregularly at inner walls of the V-grooves 21.

Thereafter, the negative resist film 150 is developed using a tetramethylammonium hydroxide (TMAH) 2.38% by weight solution. Upon this development, the negative resist film 150 in unexposed areas dissolves in the developing solution, and only the negative resist film 150 in exposed areas remains. Also, at the same time, the second coupler layers 23 also dissolve in the developing solution, and hence the resist film 150 is etched away at its part except the resist film 150 in the exposed areas, so that, as shown in FIG. 15(b), the resist film 150 and second coupler layers 23 in the interiors of the V-grooves 21 can completely be removed. Thus, in this Embodiment, the use of the negative resist film 150 enables easy removal of the resist film 150 and second coupler layers 23 in the interiors of the V-grooves 21.

Thereafter, using as an etching mask the resist film 150 having remained at the part where the optical-waveguide multi-layer members 10 are to be formed, the first coupler layers 22 are removed by wet etching making use of hydrofluoric acid or by reactive ion etching [FIG. 15(c)]. Finally, the resist film 150 is removed. Thus, the first coupler layers 22 and the second coupler layers 23 can be removed from the part of the regions 20 and 30 and the interiors of the V-grooves 21 of the wafer-shaped substrate 1 shown in FIG. 6.

Next, the wafer-shaped substrate 1 is spin-coated with the above OPI-N3105 on the whole top surface thereof to form a material solution wet coating for the lower clad layer 3. Thereafter, the wet coating is heated by means of a dryer at 100° C. for 30 minutes and then at 200° C. for 30 minutes to cause the solvent to evaporate, and subsequently heated at 370° C. for 60 minutes to effect curing to form the lower clad layer 3 in a thickness of 6 µm.

This lower clad layer 3 is spin-coated thereon with the above OPI-N3305 to form a material solution wet coating for the optical waveguide 4. Thereafter, the wet coating is heated by means of a dryer at 100° C. for 30 minutes and then at 200° C. for 30 minutes to cause the solvent to evaporate, and subsequently heated at 350° C. for 60 minutes to effect curing to form a polyimide film of 6.5 µm in thickness, serving as the optical waveguide 4.

Next, this polyimde film is patterned in the shape of optical waveguides 4 by photolithography. This is patterned using a resist pattern layer as an etching mask and by reactive ion etching making use of oxygen ions ($O_2$-RIE). Thus, the optical waveguides 4 can be formed at a time in arrangement in a large number on the substrate 1 as shown in FIG. 6. Thereafter, the resist pattern layer is peeled. Incidentally, when the resist pattern layer is exposed, the photomask is registered using registration marks 33 formed previously at the same time the V-grooves 21 are formed. This enables formation of optical waveguides 4 registered accurately to the V-grooves 21.

Next, spin coating with OPI-N3105 is so carried out as to cover the optical waveguides 4 and lower clad layers 3 to form a material solution wet coating for the upper clad layer 5. Thereafter, the wet coating is heated by means of a dryer at 100° C. for 30 minutes and then at 200° C. for 30 minutes to cause the solvent in the material solution wet coating to evaporate, and heated at 350° C. for 60 minutes to form the polyimide film upper clad layer 5.

The upper clad layer 5 is further spin-coated on its top surface with PIX-6400, followed by heating by means of a dryer at 100° C. for 30 minutes and then at 200° C. for 30 minutes to cause the solvent to evaporate, and subsequently heating at 350° C. for 60 minutes to form the polyimide film protective layer 9 having substantially a flat top surface and having thickness of about 5 µm at the end part distant from each optical waveguide 4.

Next, since the layers including the lower clad layer 3 up to the protective layer 9 are formed in the regions 20 and regions 30 as well which are regions where these layers are unnecessary, these are removed by peeling them. More specifically, as shown in FIG. 6, notches 25 and 26 are made by dicing at boundaries between the regions 20 and the optical-waveguide multi-layer members 10 and at boundaries between the optical-waveguide multi-layer members 10 and the regions 30, respectively, where the layers including the lower clad layer 3 up to the protective layer 9 are cut. Here, the depth of cutting by dicing is set to such depth that the substrate 1 is not cut apart. In the previous step, the first coupler layers 22 and the second coupler layers 23 have been removed from the top surface of the substrate 1 in the regions 20 and regions 30. Hence, the adherence between the lower clad layer 3 and the substrate 1 is small in the regions 20 and regions 30. Hence, the layers including the lower clad layer 3 up to the protective layer 9 which are mounted on the regions 20 and regions 30 can be removed with ease in the shape of belts from the substrate 1 because the notches 25 and 26 have been made. Thus, in the wafer-shaped substrate 1 shown in FIG. 6, the top surface of he substrate 1 stand uncovered in the regions 20 and regions 30.

Next, as the wafer-shaped substrate 1 stands as it is, a notch 27 is formed in each optical-waveguide multi-layer member 10 by dicing. A solder layer having any desired shape is also optionally formed on each electrode 7 in the regions 30 uncovered.

Figure 7:
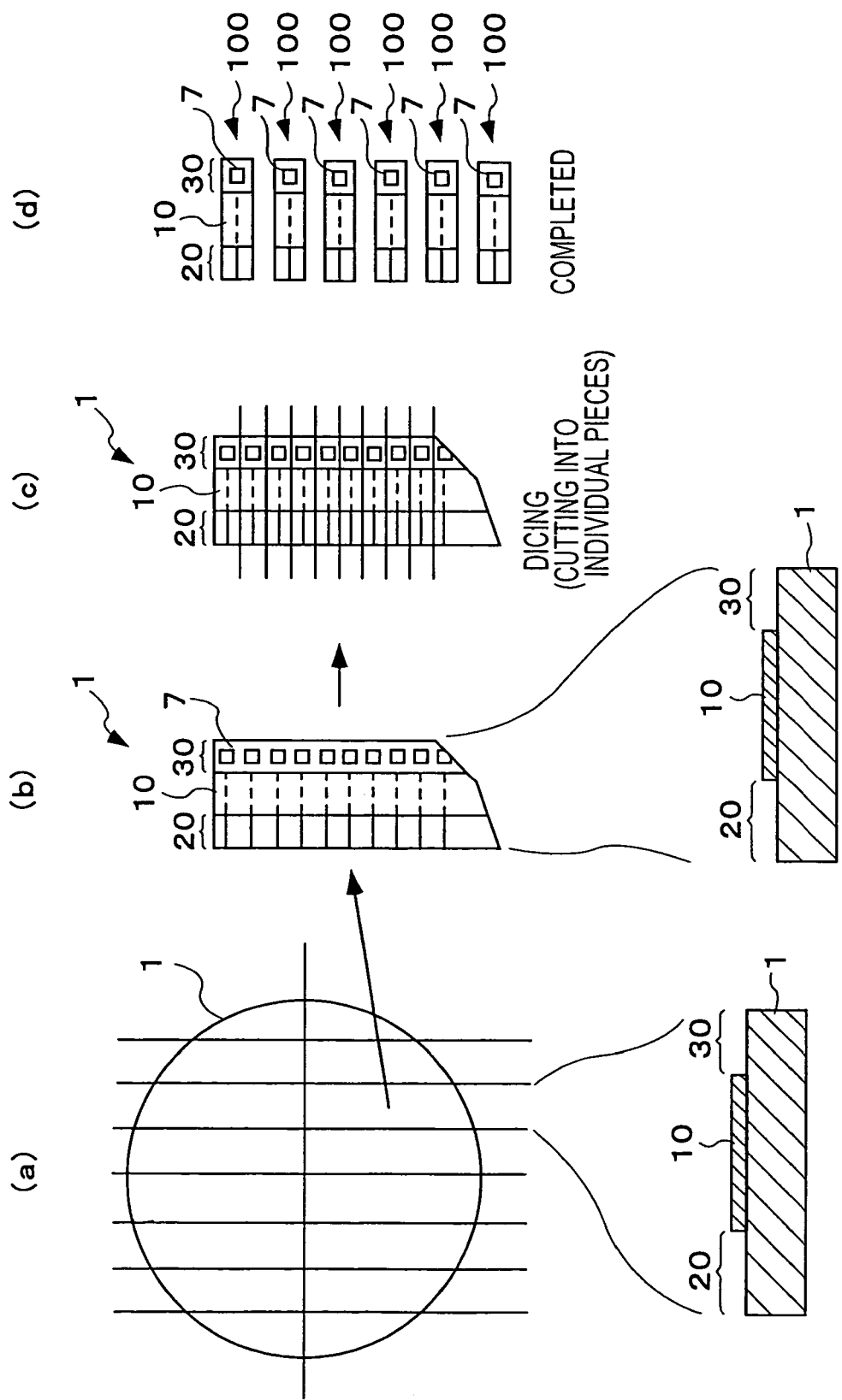
FIGS. 7(a) to (d) are illustrations showing the steps of cutting the wafer-shaped substrate in the process for producing optical elements 100 in First and Second Embodiments of the present invention.

Next, the wafer-shaped substrate 1 is cut by dicing as shown in FIGS. 7(a) and (b) to cut out it in the shape of oblong cards. The oblong-card-shaped substrates 1 are each cut out into individual optical elements 100 by dicing as shown in FIGS. 7(c) and (d) to complete the optical elements 100. Incidentally, the procedure of the dicing step is by no means limited to this procedure. The substrate 1 may be cut by dicing crosswise in the step shown in FIG. 7(a) to form the optical elements 100 as shown in FIG. 7(d).

As having been described above, in this Embodiment, by using as the material solution for the first coupler layer 22 the solution prepared by dissolving the organoaluminum compound (aluminum acetylacetonate) in the solvent (N-methyl-2-pyrrolidone), the wet coating of the first coupler layer 22 is thinly formed without any non-uniformity by means of a spin coater on the substrate 1 on which the deep V-grooves 21 have been formed, to form the first coupler layer 22 having, after drying, the film thickness distribution of from a minimum film thickness of 30 angstroms or more to a maximum film thickness of 200 angstroms or less. By forming the first coupler layer 22 to have an appropriate film thickness distribution range in this way, the action to enhance the adherence between the substrate 1 and the lower clad layer 3 in virtue of the first coupler layer 22 can be brought out, and at the same time a phenomenon can be prevented in which the first coupler layer 22 has so large film thickness that the first coupler layer 22 itself comes brittle. Thus, optical elements can be produced which can not easily cause film come-off and have optical-waveguide multi-layer members 10 having superior optical characteristics and durability.

In addition, in this Embodiment, the negative resist film 150 is used when the first coupler layer 22 and the second coupler layers 23 are removed, and hence they can be removed with ease from the interiors of the V-grooves 21.

Therefore, this makes the second coupler layers 23 and first coupler layers 22 removable by peeling them in the form of belts from the regions 20 and 30 after the optical-waveguide multi-layer members 10 have been formed on the whole surface of the wafer-shaped substrate 1, and hence the optical elements 100 having V-grooves 21 can be mass-produced.

Incidentally, in the above embodiment, described is a structure wherein the first coupler layer 22 and the second coupler layer 23 formed of the polyimide resin containing no fluorine are disposed in order to enhance the adherence between the lower clad layer 3 formed of the polyimide resin containing fluorine and the substrate 1. Instead, it is also possible to provide a structure that has no second coupler layer 23. In the case when the structure has no second coupler layer 23, the adherence between the lower clad layer 3 and the substrate 1 is somewhat lower than the case when it has the second coupler layer 23. However, since in this Embodiment the first coupler layer 22 is so formed as to be in an appropriate film thickness distribution range, adherence at a level feasible in practical use can be maintained in virtue of the action of the first coupler layer 22.

The optical element 100 having been described above has the V-groove 21 on which the optical fiber is mounted, and has the registration marks 31, 32 and 33 formed simultaneously when the V-groove 21 is formed. When the optical waveguide 4 is formed, the registration mark 33 is used to register the V-groove 21 and the optical waveguide 4 accurately. Also when the electrode 7 is formed, the registration marks 31 and 32 are used to register the electrode 7 and the V-groove 21 accurately. Also when the light-emitting element or light-receiving element is mounted on the electrode 7, the registration marks 31 and 32 are used to register the optical axis of the light-emitting element or light-receiving element accurately to the V-groove 21. Thus, the V-groove 21 and the optical waveguide 4 are kept in accurate alignment in the direction of the main plane at the time of point that the optical element 100 has been completed, and the alignment of the V-groove 21 and the optical waveguide 4 can be ensured with ease only by mounting to the former the optical fiber as designed. Also, when the light-emitting element or light-receiving element is mounted on the electrode 7, the registration marks 31 and 32 are used to make registration, whereby the light-emitting element or light-receiving element can accurately be aligned to the optical waveguide 4 with ease. This enables easy and accurate alignment of the light-emitting element or light-receiving element, the optical waveguide 4 and the optical fiber on the V-groove 21, and an optical element can be provided which has a high bonding efficiency.

(Second Embodiment)

Next, a process for producing optical elements 100 according to Second Embodiment of the present invention is described.

The optical elements 100 according to the second embodiment are each structured to have the shape and layer structure shown in FIGS. 1 to 4 like those in First Embodiment, but differ from those in First Embodiment in that an organozirconium compound film is used as the first coupler layer 22. The method of spin coating in forming the first coupler layer 22 also differs from that in First Embodiment. Further, in the second embodiment, in the step of removing first coupler layers 22 and second coupler layers 23 from regions 20 and 30, a positive resist film is used, and exposure and development methods are devised so that the resist layer and the second coupler layers 23 can completely be removed.

In this Embodiment, as the organozirconium compound constituting the first coupler layer 22, various compounds may be used as described later. Here, a zirconium tributoxyacetylacetonate film is used as the first coupler layer 22. The first coupler layer 22 may preferably have, at least in the region beneath the optical waveguide 4, a film thickness distribution in the range of from a minimum film thickness of 30 angstroms or more to a maximum film thickness of 200 angstroms or less, and particularly preferably from a minimum film thickness of 50 angstroms or more to a maximum film thickness of 150 angstroms or less. This is because if its film thickness is less than 30 angstroms, the effect of improving adherence can not well be brought out to make the lower clad layer 3 tend to come off the substrate 1. This is also because if its film thickness is more than 200 angstroms, the film may come brittle. Also, the range of from a minimum film thickness of 50 angstroms or more to a maximum film thickness of 200 angstroms or less corresponds substantially to 5 molecular layers or more to 15 molecular layers or less when expressed in terms of molecular layers (the lap of molecules) of the organozirconium compound. Of course, the first coupler layer 22 may more preferably have, not in the region beneath the optical waveguide 4 only, but in its entirety, the film thickness distribution in the range of from a minimum film thickness of 30 angstroms or more to a maximum film thickness of 200 angstroms or less. How to form the film and how to measure the film thickness are described later in detail.

The second coupler layer 23 is, like that in First Embodiment, a polyimide resin film containing no fluorine, formed using PIQ (trade name), available from Hitachi Chemical Co., Ltd. It has a film thickness of about 0.23 μm. Materials and film thickness of the lower clad layer 3, upper clad layer 5, optical waveguide 4 and protective layer 9 are also the same as those in First Embodiment.

A process for producing optical elements according to Second Embodiment is described below.

Like First Embodiment, a silicon wafer is made ready for use as the substrate 1. On the whole top surface of the substrate 1, a silicon dioxide layer 2 is formed by thermal oxidation or gaseous-phase deposition. Thereafter, V-grooves 21 are formed in arrangement as shown in FIG. 5. Here, the registration marks 31, 32 and 33 shown in FIG. 4 are also formed simultaneously. Thereafter, on the substrate 1, each electrode 7 as shown in FIG. 1 is formed. Thus, as shown in FIG. 5, V-grooves 21 and electrodes 7 are formed in arrangement in a large number on the wafer-shaped substrate 1.

Next, on the whole wafer-shaped substrate 1 shown in FIG. 5, the first coupler layer 22 is formed. First, as a material solution for the first coupler layer 22, a solution prepared by dissolving zirconium tributoxyacetylacetonate in butanol to make up a 1% by weight solution is made ready for use, and the substrate 1 is coated thereon with this solution by spin coating. This material solution tends to cause film thickness non-uniformity at the time of spin coating, compared with the first coupler layer 22 material solution used in First Embodiment. Accordingly, any of the following first to third spin coating methods are used as a spin coating method. The first coupler layer 22 can be formed in the film thickness distribution in the range of from 30 angstroms or more to 200 angstroms or less whatever method of the first to third spin coating methods is used.

Figure 10:
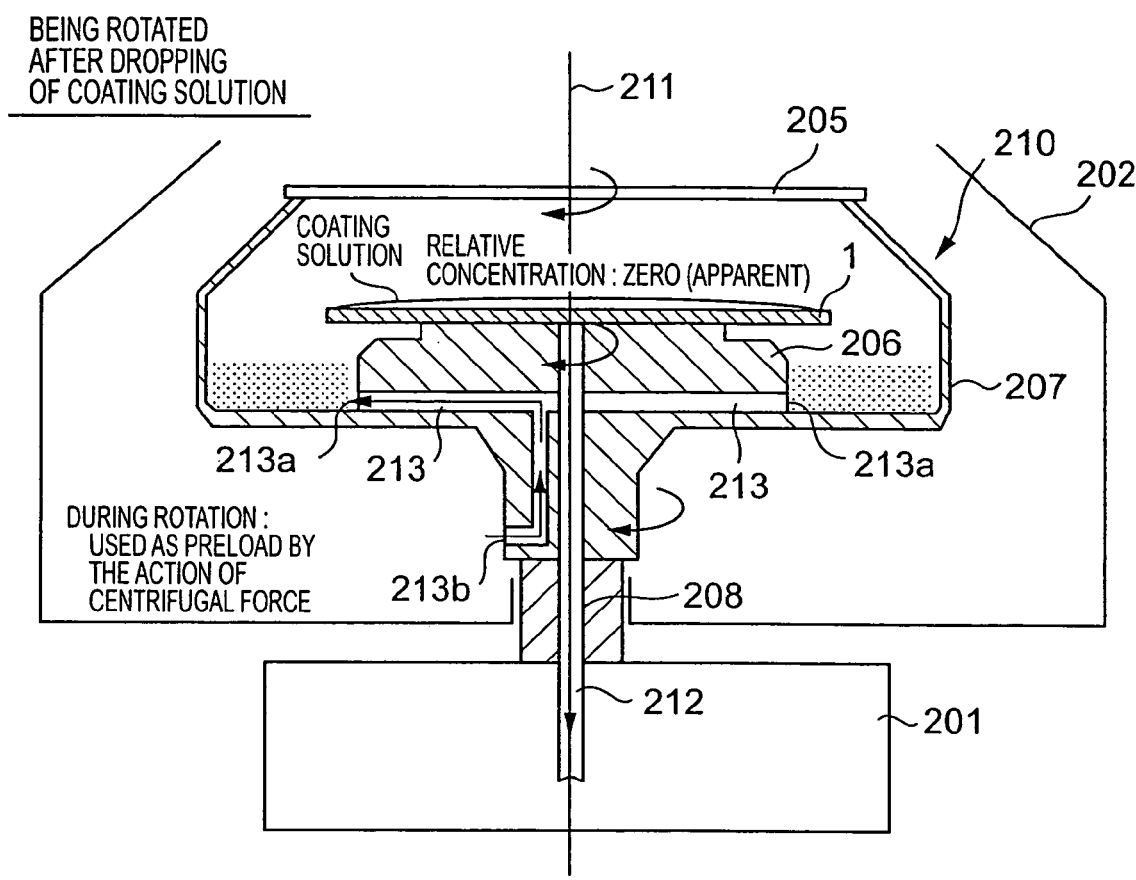
FIG. 10 is an illustration showing a structure wherein a spin coater used in forming the first coupler layer 22 is being rotated, in the process for producing optical elements 100 in Second Embodiment of the present invention.

The first spin coating method is a method making use of a spin coater shown in FIG. 10. The spin coater shown in FIG. 10 has a stationary cup 202 and a rotary cup 210 disposed inside the stationary cup 202. The rotary cup 210 has a cup-shaped main body 207, a substrate mount 206 disposed inside the main body 207, and a cover 205 with which the main body 207 is covered. The cup main body 207 is connected to a rotary drive 201, and is rotated around an axis 211. The cup main body 207 is also provided with a substrate suction through-hole 212 which communicates with the substrate mount 206. This suction through-hole 212 is connected to an evacuation system (not shown). The cup main body 207 is still also provided with a discharge through-hole 213 from which a coating solution is to be discharged. The discharge through-hole 213 is so formed as to extend from a coating solution inlet 213a toward the axis 211. Accordingly, a discharge vent 213b is disposed nearer to the axis 211 than to the inlet 213a.

When the spin coating is carried out using the spin coater shown in FIG. 10, the wafer-shaped substrate 1 is mounted on the substrate mount 206, and a organozirconium compound solution is dropped on the substrate 1. Thereafter, the cup main body 207 is covered with a cover 205. Thus, the internal space of the rotary cup 210 comes to be filled with a solvent contained in the solution, to provide a solvent atmosphere. In this state, the rotary cup is rotated, whereupon the solution is coated on the substrate 1 by centrifugal force. Here, the rotary cup is rotated for 90 seconds under conditions of from 500 rpm to 2,000 rpm. During this rotation, since the discharge vent 213b is disposed nearer to the axis 211 than to the inlet 213a, the discharge through-hole 213 undergoes a preload from the discharge vent 213b side toward the inlet 213a by centrifugal force, so that the rotary cup 210 comes to stand closed. Thus, the solution and atmosphere in the rotary cup 210 is not discharged outside. Hence, the inside of the rotary cup 210 is not evacuated, and any stream of atmosphere is not formed. Moreover, the cover 205 facing the substrate 1 is rotated together with the substrate 1 at the same speed, and hence the relative speed between the substrate 1 and the cover 205 comes to zero, and the relative speed between the atmosphere between the substrate 1 and the cover 205 and the substrate 1 also comes to zero. Thus, the atmosphere of the substrate 1 is filled with the solvent atmosphere during the rotation of the substrate 1, and also the solvent atmosphere is rotated together with the substrate 1, where any stream of the atmosphere is present. Hence, the wet coating of the solution on the substrate 1 little becomes dry.

Figure 11:
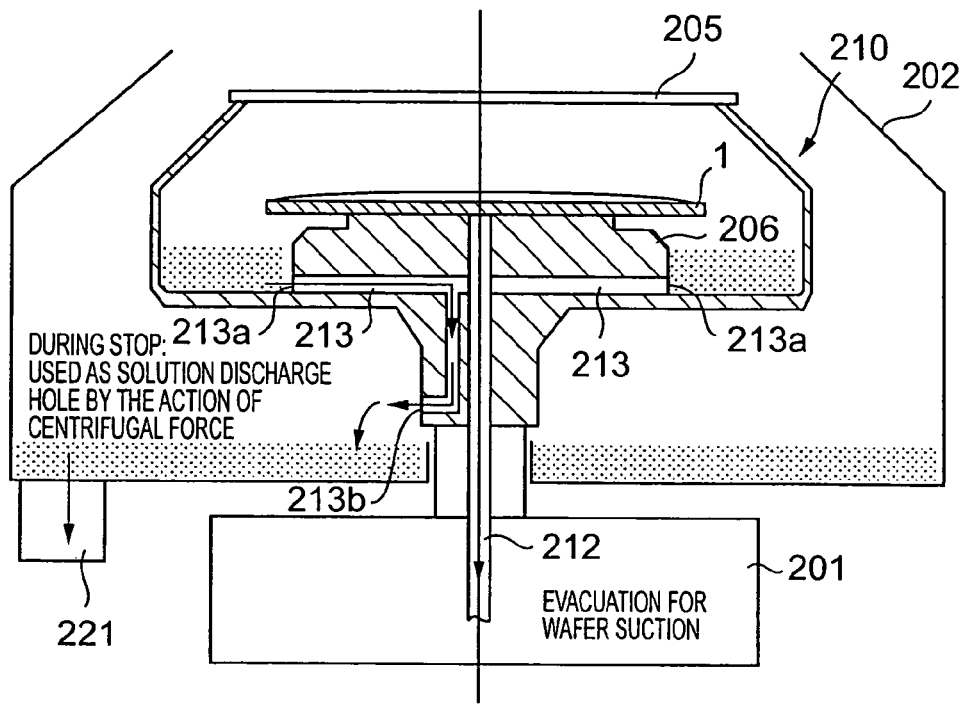
FIG. 11 is an illustration showing a structure wherein the spin coater shown in FIG. 10 stands stopped.

Thus, the spin coating is carried out using the spin coater shown in FIG. 10, which can prevent the wet coating from drying during the rotation, whereby the wet coating of the material solution for the first coupler layer 22 can uniformly be formed even on the substrate 1 where the deep V-grooves 21 are arranged in a large number as shown in FIG. 5. According to experiments made by the present inventors, the first coupler layer 22 formed by this first spin coating method has been found to have a film thickness distribution in the range of from a minimum film thickness of about 60 angstroms to a maximum film thickness of about 113 angstroms on one wafer-shaped substrate 1 in the state the wet coating is brought to a heat-and-drying step described later. The reason why the thickness non-uniformity can be made very small in this way is considered to be that, in the case of the spin coater shown in FIG. 10, the stream of atmosphere is little present and the wet coating can not easily dry during the rotation of the substrate 1, and hence, even though the solution having accumulated in the V-grooves 21 has been blown off outward by centrifugal force to form a thick wet coating there, it spreads to the surroundings to become uniform in the course the substrate 1 is further rotated as it is. After the rotation has been completed, the centrifugal force comes lost, and hence the solution flows through the discharge through-hole 213 from its inlet 213a toward its discharge vent 213b as shown in FIG. 11. Thus, a stream is produced on which the solvent atmosphere is discharged out of the inside of the rotary cup 210. Also, once the cover 205 is opened, the solvent atmosphere changes off with the air at once. Thus, the wet coating on the substrate 1, having been uniformly coated, dries at it is, so that a coating film of the material solution for the first coupler layer 22 is formed.

Figure 12:
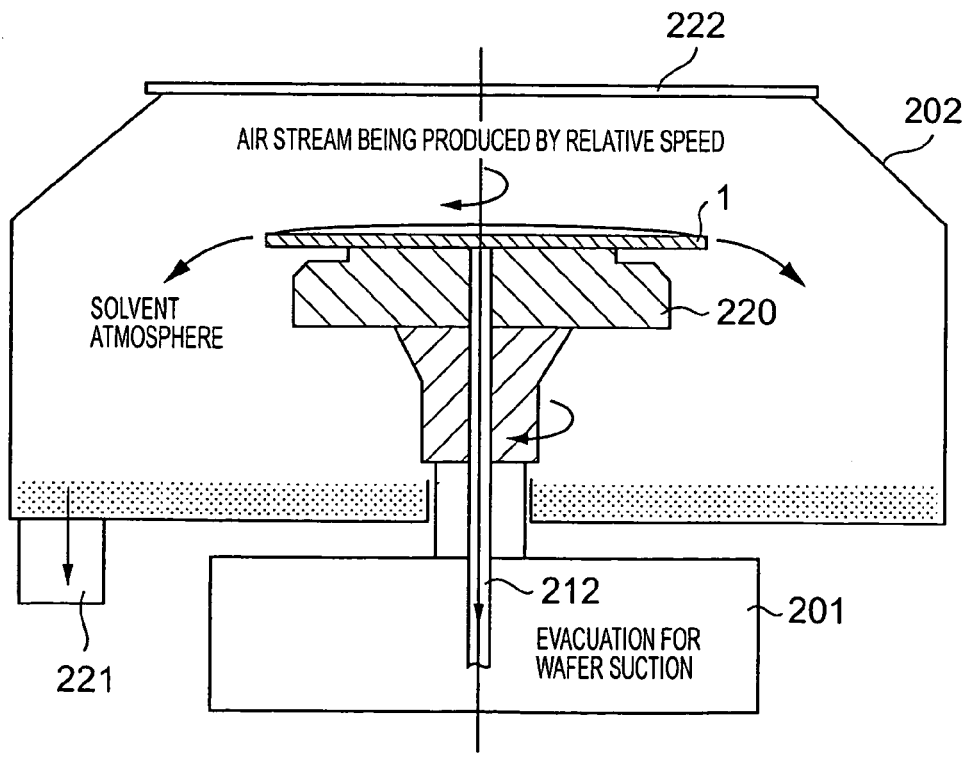
FIG. 12 is an illustration showing a structure wherein a spin coater used in forming the first coupler layer 22 is being rotated, in the process for producing optical elements 100 in Second Embodiment of the present invention.

The second spin coating method is a method making use of a spin coater shown in FIG. 12. The spin coater shown in FIG. 12 is so structured that a substrate mount 220 is directly disposed inside a stationary cup 202 and the substrate mount 220 is rotated. The stationary cup 202 is covered with a cover 222 and closed, where the inside of the rotary cup 202 is filled with a solvent contained in the solution, and the spin coating is carried out in a solvent atmosphere. In the structure shown in FIG. 12, the cover 222 stands still and hence correspondingly has the same relative speed as the rotational speed between it and substrate 1 being rotated, so that a stream of solvent atmosphere is produced between the substrate 1 and the cover 222. Because of this stream, the solution on the substrate 1 may more dry than that in the first spin coating method. However, in the second spin coating method, a method is employed in which, after the rotation has been completed, the solvent atmosphere is slowly discharged from a discharge vent 221 provided in the stationary cup 202, over a period of about 10 minutes at a low discharge speed of about 2 to 3 liters/min while the flow rate is measured with a flowmeter (not shown), and thereafter the cover 222 is opened. By using this method, the drying speed after the stopping of rotation is controlled. The first coupler layer 22 formed by this second spin coating method has been found to have a film thickness distribution in the range of from a minimum film thickness of about 54 angstroms to a maximum film thickness of about 140 angstroms on one wafer-shaped substrate 1 in the state the wet coating formed by spin coating has been brought to a heat-and-drying step described later. This film thickness distribution falls within the range of from 50 angstroms or more to 200 angstroms or less which is the range of film thickness non-uniformity that is desirable for improving adherence, and the action to improve adherence sufficiently can be attained.

The third spin coating method is a method making use of the same spin coater shown in FIG. 12 as that in the second spin coating method and in which, after the rotation has been completed, solvent atmosphere is discharged for 10 minutes controlling the discharge flow rate at 2 to 3 liters/min like the second spin coating method, but differs from the second spin coating method in that a rest time of 2 minutes is provided after the rotation has been completed and before the discharge is started. The solvent atmosphere is not discharged during this rest time of 2 minutes. By providing the rest time in this way, the uneven film thickness having resulted during the rotation is leveled to a certain extent. The first coupler layer 22 formed by this third spin coating method has been found to have a film thickness distribution in the range of from a minimum film thickness of about 59 angstroms to a maximum film thickness of about 138 angstroms on one wafer-shaped substrate 1 in the state the wet coating formed by spin coating has been brought to a heat-and-drying step described later. This film thickness distribution is narrower than the film thickness distribution obtained in the second spin coating method.

As a comparative example, a wet coating of the material solution for the first coupler layer 22 has been formed using a spin coater shown in FIG. 13. The spin coater shown in FIG. 13 resembles the above spin coater shown in FIG. 10, but differs from the FIG. 10 spin coater in that a discharge through-hole 230 is disposed on the circumferential side of a main body 207 of a rotary cup 231. In the coater shown in FIG. 13, the rotary cup 231 is rotated, whereupon the solution and internal atmosphere are continuously discharged from the discharge through-hole 230 toward the outside by centrifugal force. Hence, the inside of the rotary cup comes to have a reduced pressure, and can not maintain the solvent atmosphere to cause drying under reduced pressure, so that the solution is coated while being dried. For this reason, the film thickness distribution after the heat-and-drying step has been found not to fall within the range of from 50 angstroms or more to 200 angstroms or less.

As another comparative example, spin coating has been carried out using a spin coater shown in FIG. 14, which has the same structure as the spin coater shown in FIG. 12, except that it has no cover 222. The spin coater shown in FIG. 14 has the stationary cup 202 set open, and hence no solvent atmosphere is formed. Also, the atmosphere around the substrate 1 stands still, and hence an air stream is produced around the substrate 1. Hence, the wet coating dries during the rotation, and hence the wet coating becomes thick at its part where the solution having accumulated in the V-grooves 21 has been flowed toward the outer periphery, and dries as it stands. Hence, the first coupler layer 22 having been brought to the heat-and-drying step has been found to have a film thickness distribution of from a minimum film thickness of about 5 angstroms to a maximum film thickness of about 194 angstroms on one wafer-shaped substrate 1, bringing about a large film thickness non-uniformity. Hence, the lower clad layer 3 has come off at the part where the first coupler layer 22 has a thickness smaller than 30 angstroms.

As described above, in this Embodiment, any of the above first, second and third spin coating methods is used to carry out the coating with the material solution for the first coupler layer 22. Thereafter, the wet coating formed is dried by heating it at 160° C. for about 5 minutes. Thus, the first coupler layer 22 can be formed on the whole surface of the wafer-shaped substrate 1 shown in FIG. 5, in the film thickness distribution of from 30 angstroms or more to 200 angstroms or less. Incidentally, the temperature and time in the heat-and-drying step of forming the first coupler layer 22 may preferably appropriately be set to be approximately from 160 to 220° C. and from 5 to 10 minutes.

Next, the first coupler layer 22 is coated thereon with PIQ (trade name), available from Hitachi Chemical Co., Ltd., by spin coating to form a wet coating of a material solution for the second coupler layer 23 like that in First Embodiment. Thereafter, the wet coating is heated to make the solvent evaporate, and is further heated to make it cure to form the second coupler layer 23. The conditions for spin coating are so controlled that the second coupler layer 23 comes to have a thickness of 0.23 μm.

Next, the second coupler layer 23 and the first coupler layer 22 are removed from the top surface of the wafer-shaped substrate 1 at its part corresponding to the regions 20 and 30 where each optical-waveguide multi-layer members 10 is not disposed in the optical element having been completed.

A method by which the second coupler layers 23 and first coupler layers 22 are removed from the regions 20 and 30 on the substrate 1 is specifically described.

In Second Embodiment, using a positive resist, a resist film is formed with which only the regions where the optical-waveguide multi-layer members 10 are disposed are covered, and the second coupler layers 23 and first coupler layers 22 on the regions 20 and 30 are etched.

First, as shown in FIG. 8(a), a positive resist film 50 is formed on the whole surface of the wafer-shaped substrate 1 by coating. Here, as a fluid negative resist, OFPR800 (available from Tokyo Ohka Kogyo Co., Ltd.) is used, and this is spin-coated, followed by drying at 100° C. to form the resist film 150. Thereafter, the image of a photomask is exposed using a mercury lamp. Since the positive resist has the nature that its part exposed changes into a compound capable of dissolving in a developing solution, the photomask is so patterned that the regions 20 and 30 are irradiated by light and the part where the optical-waveguide multi-layer members 10 are to be formed is not irradiated by light. Thus, only the resist film 50 at the regions 20 and 30 is exposed to cause photoreaction to change into the compound capable of dissolving in a developing solution.

After the exposure, the positive resist film 50 is developed using a tetramethylammonium hydroxide (TMAH) 2.38% by weight solution as the developing solution. Upon this development, as shown in FIG. 8(b), the resist film 50 at the regions 20 and 30 dissolves, and the resist film 50 remains only at the part where the optical-waveguide multi-layer members 10 are to be formed. The second coupler layers 23 also dissolve at the time of development, and hence they are wet-etched and are removed from the regions 20 and 30. Incidentally, in the V-grooves 21 of the regions 20, the light reflects irregularly at inner walls of the V-grooves 21 at the time of exposure, and the light can not easily reach the bottoms and ends of the V-grooves 21. Hence, the resist film 50 and second coupler layers 23 remain partly at the bottoms and ends of the V-grooves 21. Accordingly, in this Embodiment, in order to remove the resist film 50 and second coupler layers 23 remaining there, these are again exposed using the above photomask, and then developed with TMAH. Thus, the resist film 50 and second coupler layers 23 having remained in the V-grooves 21 can completely be removed as shown in FIG. 8(c). Even when the positive resist film 50 is used, this method enables the second coupler layers 23 to be completely removed from the V-grooves 21 through the simple step in which exposure and development are repeated.

Figure 9:
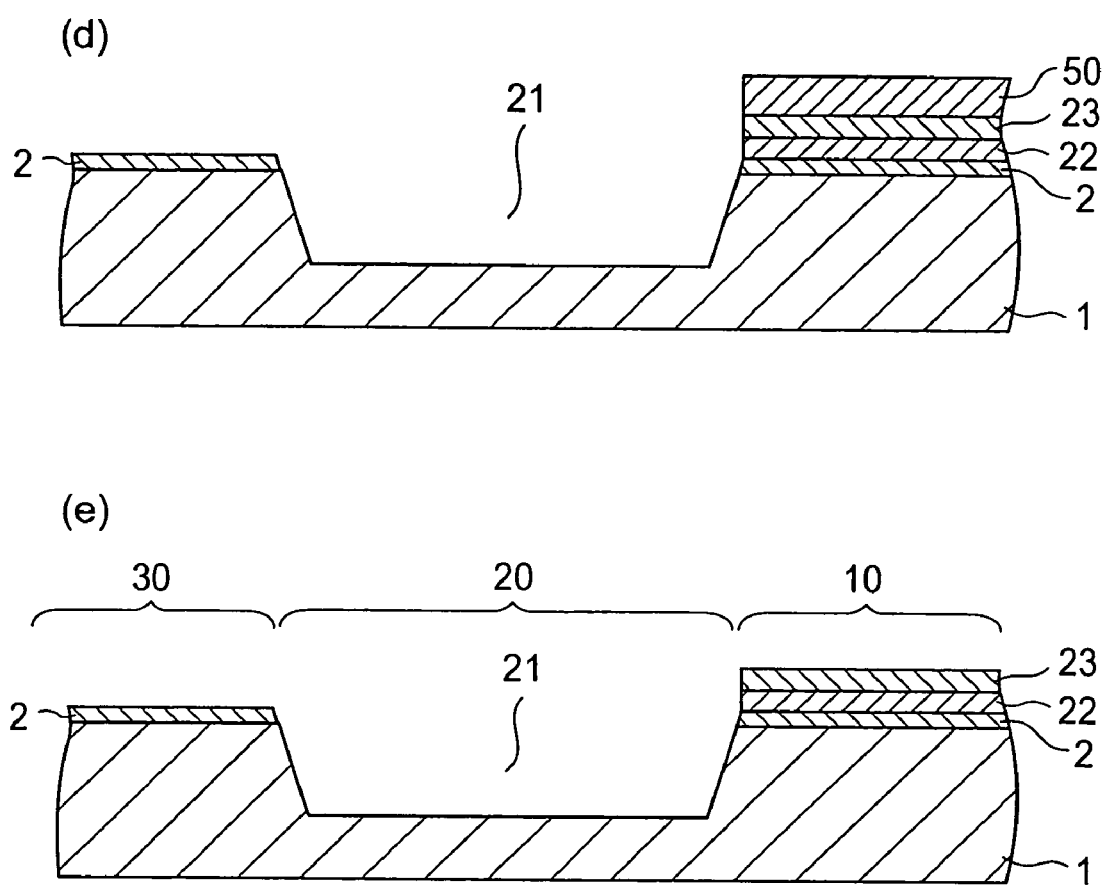
FIGS. 9(d) and (e) are illustrations showing the steps of removing the first coupler layer 22 and the second coupler layer 23 in the V-groove 21, in the process for producing optical elements 100 in Second Embodiment of the present invention.

Thereafter, using as an etching mask the resist film 150 having remained at the part where the optical-waveguide multi-layer members 10 are to be formed, the first coupler layers 22 are removed by wet etching making use of hydrofluoric acid or by reactive ion etching [FIG. 9(d)]. The first coupler layers 22 have a very small film thickness, and hence the layers inside the V-grooves 21 can also be removed by wet etching or reactive ion etching. Finally, the resist film 50 is removed [FIG. 9(e)]. Thus, the first coupler layers 22 and the second coupler layers 23 can be removed from the part of the regions 20 and 30 and the interiors of the V-grooves 21 of the wafer-shaped substrate 1 shown in FIG. 6.

Thereafter, in the same manner as in First Embodiment, a lower clad layer 3, optical waveguides 4, an upper clad layer 5 and a protective layer 9 are formed on the wafer-shaped substrate 1, and these layers are peeled off from the part of the regions 20 and 30, followed by dicing for each optical element 100 to complete optical elements 100.

As having been described above, in the Second Embodiment, by using as the material solution for the first coupler layer 22 the solution prepared by dissolving the organozirconium compound (zirconium tributoxyacetylacetonate) in the solvent (butanol) and using any of the first, second and third spin coating methods, the first coupler layer 22 is thinly formed without any non-uniformity in spite of the substrate 1 on which the deep V-grooves 21 have been formed. Stated specifically, the film thickness distribution range can be achieved which is of from 30 angstroms or more to 200 angstroms or less, in particular, from 50 angstroms or more to 150 angstroms or less. This is because the first, second and third spin coating methods are methods of carrying out spin coating in the solvent atmosphere and can keep the wet coating from drying during the spin coating. Thus, forming the first coupler layer 22 thinly and without any non-uniformity enables enhancement of the adherence between the substrate 1 and the lower clad layer 3, and enables production of optical elements which cannot easily cause film come-off and have optical-waveguide multi-layer members 10 having superior optical characteristics and durability.

Now, how to measure the film thickness of the first coupler layer 22 is described.

Described first is how to measure the film thickness as a form that is at the stage where the first coupler layer 22 has been formed on the substrate 1.

The film thickness may be measured with a non-contact optical thin-film gauge F40 (hereinafter "F40"), provided by Filmetrics Inc. and making measurement by reflectance spectroscopy. A specific measuring method is shown below.

First, the initial-stage setting of sensor sensitivity is performed. On the metal microscope stage of the above F40, a mirror-polished silicon wafer (recommended is an attachment manufactured by Filmetrics Inc.) is set with its polished surface up, and a sensor sensitivity initial-stage setting button is set. Next, in the state its light source is light-screened, the dark button is set to perform the initial-stage setting of sensor sensitivity.

Next, the film thickness of the silicon dioxide layer 2 formed on the substrate 1 as a subbing layer is measured. As a measuring method therefor, the substrate 1 on which the silicon dioxide layer 2 has been formed is placed on the microscope stage. The refractive index of the silicon dioxide layer is set on a refractive-index-setting picture plane, and the silicon dioxide layer is set to the first layer on a measurement-parameter-setting picture plane, where the measurement button is pushed. Thus, the film thickness of the silicon dioxide layer 2 is determined. Measuring the film thickness of the silicon dioxide layer 2 in this measurement is to enhance the precision of the film thickness measurement of the first coupler layer 22.

Incidentally, as the refractive index of the silicon dioxide layer 2, the following value is set. In respect of wavelength of 330 nm, a refractive index of 1.480 is set; in respect of wavelength of 577 nm, a refractive index of 1.458; in respect of wavelength of 1,128 nm, a refractive index of 1.448; and in respect of wavelength of 1,362 nm, a refractive index of 1.446.

Next, the film thickness of the first coupler layer 22 organozirconium compound layer is measured. Its procedure is the same as that of the measuring method on the silicon dioxide layer 2, provided that it is necessary to input, on a measurement parameter picture plane, the film thickness of the first-layer silicon dioxide layer 2 that has already been measured, to set the organozirconium compound layer at the second layer.

Here, as the refractive index of the organozirconium compound layer, the following value is set. In respect of wavelength of 633 nm, a refractive index of 1.613 is set; in respect of wavelength of 830 nm, a refractive index of 1.613; and in respect of wavelength of 1,300 nm, a refractive index of 1.613.

Next, the substrate on which the first coupler layer 22 (organozirconium compound layer) has been formed is set on the microscope and the measurement button is pushed, thus the film thickness of the first coupler layer 22 can be measured.

As a point to which attention be paid, it is the point that the microscope in the instrument is focused on the surface of the first coupler layer 22 at the time of the measurement of the layer 22, and focused on the surface of the silicon dioxide layer 2 at the time of the measurement of the layer 2. It is also desirable for the microscope to have an objective lens of about 10 magnifications. Under this condition, the minimum measurement limit is about 10 angstroms.

Next, how to measure the film thickness of the first coupler layer 22 is described on the basis of the form of the optical element shown in FIG. 1.

As procedure of the measurement, first, the polyimide films second coupler layer 23, lower clad layer 3, optical waveguide 4, upper clad layer 5 and protective layer 9 are removed for the most part of these to make the top surface of the first coupler layer 22 uncovered. These polyimide films are removed by removing their greater part by dry etching and thereafter removing the remaining polyimide films by wet etching. Next, the first coupler layer 22 is removed by dry etching only at its partial area to make the top surface of the underlying silicon dioxide layer 2 uncovered. Thereafter, the film thickness of the silicon dioxide layer 2 and the film thickness of the first coupler layer 22 are measured in the same manner as the above, using F40.

The dry etching to remove the polyimide films is carried out by reactive ion etching making use of oxygen ions ($O_2$-RIE), which are so etched that a polyimide film remains on the first coupler layer 22 in a thickness of about 1 to 2 μm. The remaining polyimide film is removed by wet etching by subjecting it to immersion treatment at room temperature for about 1 hour, using a polyimide film solvent N-methyl-2-pyrrolidone or N,N-dimethylacetamide. As the solvent used here, it is preferable to select a solvent to which the first coupler layer 22 (organozirconium compound layer) has resistance.

Next, the substrate 1 is divided by, e.g., breaking it into two or more pieces. Then, only some divided-substrate pieces are subjected to the reactive ion etching making use of oxygen ions ($O_2$-RIE) to remove the first coupler layer 22. Here, the underlying silicon dioxide layer 2 has a high resistance to dry etching, and hence the film thickness loss of the silicon dioxide layer 2 is 0.01 μm or less, and little adversely affects the precision of measurement of the silicon dioxide layer 2 formed in a thickness of approximately from 5,000 angstroms to 10,000 angstroms.

Thereafter, on a divided-substrate piece where the silicon dioxide layer 2 stands uncovered, the film thickness of the silicon dioxide layer 2 is measured with F40. Using the measurement data obtained, the film thickness of the first coupler layer is measured on a divided-substrate piece where the first coupler layer 22 remains. The measurement may be made in the same manner as the above.

In the Second Embodiment, the positive resist film 50 is used when the first coupler layers 22 and the second coupler layers 23 are removed, and the exposure and the development are performed a plurality of times, whereby they can relatively easily be removed from the interiors of the V-grooves 21. Therefore, this makes the second coupler layers 23 and first coupler layers 22 removable by peeling them in the form of belts from the regions 20 and 30 after the optical-waveguide multi-layer members 10 have been formed on the whole surface of the wafer-shaped substrate 1, and hence the optical elements 100 having V-grooves 21 can be mass-produced.

In Second Embodiment, the positive resist film 50 is used when the first coupler layer 22 and second coupler layer 23 are removed. Instead, it is also possible of course to use the negative resist film 150 as described in First Embodiment.

In the above Embodiments, described is a structure wherein the first coupler layer 22 and the second coupler layer 23 formed of the polyimide resin containing no fluorine are disposed in order to enhance the adherence between the lower clad layer 3 formed of the polyimide resin containing fluorine and the substrate 1. Instead, it is also possible to provide a structure that has no second coupler layer 23. In the case when the structure has no second coupler layer 23, the adherence between the lower clad layer 3 and the substrate 1 is somewhat lower than the case when it has the second coupler layer 23. However, adherence at a level feasible in practical use can be maintained in virtue of the action of the first coupler layer 22.

In the First and Second Embodiments, the wet etching is used to remove the second coupler layer 23. If, however, e.g., reactive ion etching (RIE) is used, the anisotropy of plasma is so strong that the shape of the second coupler layer 23 at the flat portion of the substrate 1 can be controlled with ease, but the resin of the second coupler layer 23 present inside the V-groove 21 whose slanting surfaces incline obliquely is removable in a poor efficiency. On the other hand, if ashing is used to remove the second coupler layer 23, the isotropy of plasma is so strong that, in an attempt to remove the resin of the second coupler layer 23 present inside the V-groove 21, the shape of the second coupler layer 23 at the flat portion of the substrate 1 can be controlled with difficulty. Also, if the reactive ion etching and the ashing are used in combination to remove the second coupler layer 23 in the flat portion of the substrate 1 and in the V-groove 21 by the RIE and the ashing, respectively, side etching tends to take place at the time of ashing, in the second coupler layer 23 at the part where the optical-waveguide multi-layer member 10 is to be formed. On the other hand, the use of the wet etching as in this Embodiment enables removal of the second coupler layer 23 with ease. Also, in this Embodiment, the use of the wet etchant (TMAH) as the developing solution enables simultaneous removal of the resist film 50 and the second coupler layer 23, and hence there can be an advantage that the number of steps can be smaller.

In the optical elements according to First and Second Embodiments having been described above, the optical waveguide 4 has a linear shape. The optical waveguide 4 of the optical-waveguide multi-layer member 10 may have, without limitation to the linear shape, the shape of a y-branch, an x-type or the like in conformity with functions required as optical elements. Correspondingly thereto, each optical element may be so structured as to have a plurality of V-grooves 21 so that a plurality of optical fibers can be mounted. In respect of the electrode 7 as well, a plurality of electrodes may be disposed so that a plurality of light-emitting elements or light-receiving elements can be mounted.

In the present invention, the optical element refers to one in which, using as a substrate an inorganic material such as glass or quartz, a semiconductor or metallic material such as silicon, gallium arsenide, aluminum or titanium, a polymeric material such as polyimide or polyamide, or a composite material of any of these, an optical waveguide, an optical coupler, an optical branching filter, an optical attenuator, an optical diffraction grating, an optical amplifier, an optical interference filter, an optical filter, an optical switch, a wavelength converter, a light-emitting element, a light-receiving element or a composite of any of these has been formed on the substrate. On the substrate, a semiconductor device such as a light-emitting diode or a photodiode may also be formed. Further, in order to protect the substrate or control the refractive index, a film of silicon dioxide, silicon nitride, aluminum oxide, aluminum nitride or tantalum oxide may also be formed on the substrate.

In First Embodiment, the first coupler layer 22 is formed of an organoaluminum compound. In Second Embodiment, the second coupler layer 23 is formed of an organozirconium compound. Instead, the first coupler layer 22 may be so formed as to contain at least one of an organoaluminum compound and an organozirconium compound.

The organozirconium compound constituting the first coupler layer 22 in Second Embodiment may preferably be a zirconium ester or a zirconium chelate compound.

The zirconium ester may include tetrapropyl zirconate and tetrabutyl zirconate. The zirconium chelate compound may include tetrakis(acetylacetonato)zirconium, monobutoxytris(acetylacetonato)zirconium, dibutoxybis(acetylacetonato)zirconium, tributoxyacetylacetonatozirconium, tetra (ethylacetylacetonato)zirconium, monobutoxytris (ethylacetylacetonato)zirconium, dibutoxybis (ethylacetylacetonato)zirconium, tributoxyethylacetylacetonatozirconium, tetrakis(ethyllactonato)zirconium, bis(bisacetylacetonato)bis(ethylacetylacetonato)-zirconium, monoacetylacetylacetonatotris-(ethylacetylacetonato)zirconium and monobutoxymonoacetylacetonatobis(ethylacetyl-acetonato) zirconium. In either case of the zirconium ester and the zirconium chelate compound, examples are by no means limited to these as long as they are those containing zirconium oxide at the time of film formation. Any of the above compounds may be used alone or in the form of a mixture.

The organozirconium compound is dissolved in an organic solvent such as methanol, ethanol, butanol, benzene, toluene, N-methyl-2-pyrrolidone, N,N-dimethylacetamide or γ-butyrolactone or in water to make a solution, with which the surface of the substrate is coated by spin coating or the like, followed by drying at 70 to 400° C. to from the film. The organozirconium compound may preferably have a film thickness in the range of from 50 angstroms or more to 200 or less.

As the resin constituting the second coupler layer 23 in the present embodiments, a resin containing no fluorine may be used, and various resins may be used, as exemplified by polyimide type resins, silicone type resins, acrylic resins, polycarbonate type resins, epoxy type resins, polyamide type resins, polyester type resins and phenolic type resins. In uses where heat resistance is required in element production steps or in use environment, polyimide type resins, polyquinoline type resins or the like are preferred. As the resin containing no fluorine, a resin containing nitrogen is preferred.

Where a polyimide type resin containing no fluorine is used as the resin of the second coupler layer 23 used in First and Second Embodiments, it may include, e.g., polyimide resin, poly(imide.isoindoloquinazolinedioneimide) resin, polyether-imide resin, polyamide-imide resin and polyester-imide resin. As the resin containing no fluorine that is used as the resin of the second coupler layer 23 in the present embodiments, in place of a resin containing no fluorine at all, a resin may be selected in which the fluorine content is sufficiently lower than the fluorine content of polyimide type resins containing fluorine. In such a case, the fluorine content may preferably be a half or less of that in the optical waveguide formed of a polyimide type resin containing fluorine. Stated specifically, the fluorine content may preferably be 10% by weight or less, and more preferably 2% by weight or less.

In First and Second Embodiments, the polyimide type resin containing fluorine that is used to form the lower clad layer 3, optical waveguide 4, upper clad layer 5 and so forth may include polyimide resin having fluorine, poly(imide-.isoindoloquinazolinedioneimide) resin having fluorine, polyether-imide resin having fluorine, polyamide-imide resin having fluorine, and polyester-imide resin having fluorine. When the polyamide-imide resin is obtained, trimellitic anhydride chloride or the like is used. A precursor solution of the polyimide type resin is obtained by the reaction of a tetracarboxylic dianhydride with a diamine in a polar solvent such as N-methyl-2-pyrrolidone, N,N-dimethylacetamide, γ-butyrolactone or dimethyl sulfoxide. A precursor solution of the polyimide type resin having fluorine may be produced by the reaction of a tetracarboxylic dianhydride having fluorine with a diamine. A precursor solution of the polyimide type resin having fluorine may also be produced by the reaction of a tetracarboxylic dianhydride with a diamine having fluorine. A precursor solution of a polyimide type resin having no fluorine may be produced where either of the tetracarboxylic dianhydride and the diamine has no fluorine.

As examples of the tetracarboxylic dianhydride having fluorine, it may include (trifluoromethyl)pyromellitic dianhydride, di(trifluoromethyl)pyromelliticdianhydride, di(heptafluoropropyl)pyromellitic dianhydride, pentafluoroethylpyromellitic dianhydride, bis{3,5-(trifluoromethyl)phenoxy}pyromellitic dianhydride, 2,2-bis(3,4-dicarboxyphenyl)hexafluoropropane dianhydride, 5,5'-bis(trifluoromethyl)-3,3',4,4'-tetracarboxyphenyl dianhydride, 2,2',5,5'-tetrakis(trifluoromethyl)-3,3',4,4'-tetracarb oxyphenyl dianhydride, 5,5'-bis(trifluoromethyl)-3,3',4,4'-tetracarboxydiphenyl ether dianhydride, 5,5'-bis(trifluoromethyl)-3,3',4,4'-tetracarboxybenzophenone dianhydride, bis{(trifluoromethyl)dicarboxyphenoxy}benzene dianhydride, bis{(trifluoromethyl)dicarboxyphenoxy}(trifluoromethyl)benzene dianhydride, bis(dicarboxyphenoxy)(trifluoromethyl)benzene dianhydride, bis(dicarboxyphenoxy)bis(trifluoromethyl)benzene dianhydride, bis(dicarboxyphenoxy)tetrakis(trifluoromethyl)benzene dianhydride, 2,2-bis{(4-(3, 4-dicarboxyphenoxy)phenyl}hexafluoropropane dianhydride, bis{(trifluoromethyl)dicarboxyphenoxy}biphenyl dianhydride, bis{(trifluoromethyl)dicarboxyphenoxy}bis(trifluoromethyl)biphenyl dianhydride, bis{(trifluoromethyl)dicarboxyphenoxy}diphenyl ether dianhydride, bis(dicarboxyphenoxy)bis(trifluoromethyl)biphenyl dianhydride, 1,4-bis(2-hydroxyhexafluoroisopropyl)benzene bis(trimellitic anhydride), and 1,3-bis(2-hydroxyhexafluoroisopropyl)benzene bis(trimellitic anhydride). Two or more of these may be used in the form of a mixture.

As examples of the tetracarboxylic dianhydride having no fluorine, it may include pyromellitic dianhydride, benzene-1,2,3,4-tetracarboxylic dianhydride, 3,3',4,4'-diphenyltetracarboxylic dianhydride, 2,2',3,3'-diphenyltetracarboxylic dianhydride, 2,3',3',4-diphenyltetracarboxylic dianhydride, p-terphenyl-3,4,3",4"-tetracarboxylic dianhydride, m-terphenyl-3,4,3",4"-tetracarboxylic dianhydride, 1,2,5,6-naphthalenetetracarboxylic dianhydride, 2,3,6,7-naphthalenetetracarboxylic dianhydride, 1,2,4,5-naphthalenetetracarboxylic dianhydride, 1,4,5,8-naphthalenetetracarboxylic dianhydride, 2,6-dichloronaphthalene-1,4,5,8-tetracarboxylic dianhydride, 2,7-dichloronaphthalene-1,4,5,8-tetracarboxylic dianhydride, 2,3,6,7-tetrachloronaphthalene-1,4,5,8-tetracarboxylic dianhydride, 2,3,5,6-pyridinetetracarboxylicdianhydride, 3,4,5,9,10-perilenetetracarboxylic dianhydride, 3,3',4,4'-benzophenonetetracarboxylic dianhydride, 2,2',3,3'-benzophenonetetracarboxylic dianhydride, 2,3,3',4'-benzophenonetetracarboxylic dianhydride, 3,3',4,4'-biphenyl ether tetracarboxylic dianhydride, 4,4'-sulfonyldiphthalic dianhydride, 3,3,4,4'-tetraphenylsilane tetracarboxylic dianhydride, 3,3,4,4'-diphenyl ether tetracarboxylic dianhydride, 1,3-bis(3,4-dicarboxyphenyl)-1,1,3,3-tetramethyldisiloxane dianhydride, 1-(2,3-dicarboxyphenyl)-3-(3,4-dicarboxyphenyl)-1,1,3,3-tetramethyldisiloxane dianhydride, 2,2-bis(3,4-dicarboxyphenyl)propane dianhydride, 2,2-bis(2,3-dicarboxyphenyl)propane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)methane dianhydride, bis(3,4-dicarboxyphenyl)sulfone dianhydride, phenanthrene-1,8,9,10-tetracarboxylic dianhydride, pyrazine-2,3,5,6-tetracarboxylic dianhydride, thiophene-2,3,4,5-tetracarboxylic dianhydride, bis(3,4-dicarboxyphenyl)dimethylsilane dianhydride, bis(3,4-dicarboxyphenyl)methylphenylsilane dianhydride, bis(3,4-dicarboxyphenyl)diphenylsilane dianhydride, 1,4-bis(3,4-dicarboxyphenyldimethylsilyl)benzene dianhydride, 1,3-bis(3,4-dicarboxyphenyl)-1,1,3,3-tetramethyldicyclo hexane dianhydride, p-phenylbis(trimellitic monoester anhydride), ethylene glycol bis(trimellitic anhydride), propanediol bis(trimellitic anhydride), butanediol bis(trimellitic anhydride), pentanediol bis(trimellitic anhydride), hexanediol bis(trimellitic anhydride), octanediol bis(trimellitic anhydride), decanediol bis(trimellitic anhydride), ethylenetetracarboxylic dianhydride, 1,2,3,4-butanetetracarboxylic dianhydride, decahydronaphthalene-1,4,5,8-tetracarboxylic dianhydride, 4,8-dimethyl-1,2,3,5,6,7-hexahydronaphthalene-1,2,5,6-tetracarboxylic dianhydride, cyclopentane-1,2,3,4-tetracarboxylic dianhydride, pyrrolidine-2,3,4,5-tetracarboxylic dianhydride, 1,2,3,4-cyclobutanetetracarboxylic dianhydride, bis(exo-bicyclo[2,2,1]heptane-2,3-dicarboxylic anhydride), sulfone bicyclo-(2,2,2)-octo(7)-ene-2,3,5,6-tetracarboxylic dianhydride, 4,4'bis(3,4-dicarboxyphenoxy)diphenyl sulfide dianhydride, 5-(2,5-dioxotetrahydrofuryl)-3-methyl-3-cyclohexene-1,2-dicarboxylic dianhydride, and tetrahydrofuran-2,3,4,5-tetracarboxylic dianhydride. Two or more of these may be used in the form of a mixture.

As examples of the diamine having fluorine, it may include 4-(1H,1H,11H-eicosafluoroundecanoxy)-1,3-diaminobenzene, 4-(1H,1H-perfluoro-1-butanoxy)-1,3-diaminobenzene, 4-(1H,1H-perfluoro-1-heptanoxy)-1,3-diaminobenzene, 4-(1H,1H-perfluoro-1-octanoxy)-1,3-diaminobenzene, 4-pentafluoropheoxy-1,3-diaminobenzene, 4-(2,3,5,6-tetrafluorophenoxy)-1,3-diaminobenzene, 4-(4-fluorophenoxy)-1,3-diaminobenzene, 4-(1H,1H,2H,2H-perfluoro-1-hexanoxy)-1,3-diaminobenzene, 4-(1H,1H,2H,2H-perfluoro-1-dodecanoxy)-1,3-diaminobenzene, (2,5-)diaminobenzotrifluoride, bis(trifluoromethyl)phenylenediamine, diaminotetra(trifluoromethyl)benzene, diamino(pentafluoroethyl)benzene, 2,5-diamino(perfluorohexyl)benzene, 2,5-diamino(perfluorobutyl)benzene, 1,4-bis(4-aminophenyl)benzene, p-bis(4-amino-2-trifluormethylphenoxy)benzene, bis(aminophenoxy)bis(trifluoromethyl)benzene, bis(aminophenoxy)tetrakis(trifluoromethyl)benzene, bis{2-[(aminophenoxy)phenyl]

hexafluoroisopropyl}benzene, 2,2'-bis(trifluoromethyl)-4,4'-diaminobiphenyl, 3,3'-bis(trifluoromethyl)-4,4'-diaminobiphenyl, octafluorobenzidine, bis{(trifluoromethyl)aminophenoxy}biphenyl, 4,4'-bis(4-amino-2-trifluormethylphenoxy)biphenyl, 4,4'-bis(4-amino-3-trifluormethylphenoxy)biphenyl, 1,4-bis(anilino)ocafluorobutane, 1,5-bis(anilino)decafluoropentane, 1,7-bis(anilino)tetradecafluoroheptane, 3,3'-difluoro-4,4'-diaminodiphenyl ether, 3,3',5,5'-tetrafluoro-4,4'-diaminodiphenyl ether, 2,2-bis(trifluoromethyl)-4,4'-diaminodiphenyl ether, 3,3-bis(trifluoromethyl)-4,4'-diaminodiphenyl ether, 3,3',5,5'-tetrakis(trifluoromethyl)-4,4'-diaminodiphenyl ether, 3,3'-difluoro-4,4'-diaminodiphenylmethane, 3,3'-di(trifluomethyl)-4,4'-diaminodiphenylmethane, 3,3',5,5'-tetrafluoro-4,4'-diaminodiphenylmethane, 3,3',5,5'-tetrakis(trifluoromethyl)-4,4'-diaminodiphenylmethane, 3,3'-difluoro-4,4'-diaminodiphenylpropane, 3,3',5,5'-tetrafluoro-4,4'-diaminodiphenylpropane, 3,3'-bis(trifluoromethyl)-4,4'-diaminodiphenylpropane, 3,3',5,5'-tetrakis(trifluoromethyl)-4,4'-diaminodiphenylpropane, 3,3'-difluoro-4,4'-diaminodiphenylsulfone, 3,3',5,5'-tetrafluoro-4,4'-diaminodiphenylsulfone, 3,3'-bis(trifluoromethyl)-4,4'-diaminodiphenylsulfone, 3,3',5,5'-tetrakis(trifluoromethyl)-4,4'-diaminodiphenylsulfone, 4,4'-bis(4-amino-2-trifluoromethylphenoxy)diphenylsulfone, 4,4'-bis(3-amino-5-trifluoromethylphenoxy)diphenylsulfone, 3,3'-difluoro-4,4'-diaminodiphenyl sulfide, 3,3',5,5'-tetrafluoro-4,4'-diaminodiphenyl sulfide, 3,3'-bis(trifluoromethyl)-4,4'-diaminodiphenyl sulfide, 3,3',5,5'-tetrakis(trifluoromethyl)-4,4'-diaminodiphenyl sulfide, 3,3'-difluoro-4,4'-diaminobenzophenone, 3,3',5,5'-tetrafluoro-4,4'-diaminobenzophenone, 3,3'-bis(trifluoromethyl)-4,4'-diaminobenzophenone, 3,3',5,5'-tetrakis(trifluoromethyl)-4,4'-diaminobenzophenone, 4,4'-diamino-p-terphenyl, 3,3'-dimethyl-4,4'-diaminodiphenylhexafluoropropane, 3,3'-dimethoxy-4,4'-diaminodiphenylhexafluoropropane, 3,3'-diethoxy-4,4'-diaminodiphenylhexafluoropropane, 3,3'-difluoro-4,4'-diaminodiphenylhexafluoropropane, 3,3'-dichloro-4,4'-diaminodiphenylhexafluoropropane, 3,3'-dibromo-4,4'-diaminodiphenylhexafluoropropane, 3,3',5,5'-tetamethyl-4,4'-diaminodiphenylhexafluoropropane, 3,3',5,5'-tetamethoxy-4,4'-diaminodiphenylhexafluoropropane, 3,3',5,5'-tetaethoxy-4,4'-diaminodiphenylhexafluoropropane, 3,3',5,5'-tetrafluoro-4,4'-diaminodiphenylhexafluoropropane, 3,3',5,5'-tetachloro-4,4'-diaminodiphenylhexafluoropropane, 3,3',5,5'-tetabromo-4,4'-diaminodiphenylhexafluoropropane, 3,3',5,5'-tetakis(trifluoromethyl)-4,4'-diaminodiphenyl hexafluoropropane, 3,3'-bis(trifluoromethyl)-4,4'-diaminodiphenylhexafluoropropane, 2,2-bis(4-aminophenyl)hexafluoropropane, 1,3-bis(anilino)hexafluoropropane, 2,2-bis{4-(4-aminophenoxy)phenyl}hexafluoropropane, 2,2-bis{4-(3-aminophenoxy)phenyl}hexafluoropropane, 2,2-bis{4-(2-aminophenoxy)phenyl}hexafluoropropane, 2,2-bis{4-(4-aminophenoxy)-3,5-dimethylphenyl}hexafluoropropane, 2,2-bis{4-(4-aminophenoxy)-3,5-ditrifluoromethylphenyl}hexafluoropropane, 2,2-bis{4-(4-amino-3-trifluoromethylphenoxy)phenyl}hexafluoropropane, bis[{(trifluoromethylaminophenoxy}phenyl]hexafluoropropane, 1,3-diamino-5-(perfluorononenyloxy)benzene, 1,3-diamino-4-methyl-5-(perfluorononenyloxy)benzene, 1,3-diamino-4-methoxy-5-(perfluorononenyloxy)benzene, 1,3-diamino-2,4,6-trifluoro-5-(perfluorononenyloxy)benzene, 1,3-diamino-4-chloro-5-(perfluorononenyloxy)benzene, 1,3-diamino-4-bromo-5-(perfluorononenyloxy)benzene, 1,2-diamino-4-(perfluorononenyloxy)benzene, 1,2-diamino-4-methyl-5-(perfluorononenyloxy)benzene, 1,2-diamino-4-methoxy-5-(perfluorononenyloxy)benzene, 1,2-diamino-3,4,6-trifluoro-5-(perfluorononenyloxy)benzene, 1,2-diamino-4-chloro-5-(perfluorononenyloxy)benzene, 1,2-diamino-4-bromo-5-(perfluorononenyloxy)benzene, 1,4-diamino-3-(perfluorononenyloxy)benzene, 1,4-diamino-2-methyl-5-(perfluorononenyloxy)benzene, 1,4-diamino-2-methoxy-5-(perfluorononenyloxy)benzene, 1,4-diamino-2,3,6-trifluoro-5-(perfluorononenyloxy)benzene, 1,4-diamino-2-chloro-5-(perfluorononenyloxy)benzene, 1,4-diamino-2-bromo-5-(perfluorononenyloxy)benzene, 1,3-diamino-5-(perfluorohexenyloxy)benzene, 1,3-diamino-4-methyl-5-(perfluorohexenyloxy)benzene, 1,3-diamino-4-methoxy-5-(perfluorohexenyloxy)benzene, 1,3-diamino-2,4,6-trifluoro-5-(perfluorohexenyloxy)benzene, 1,3-diamino-4-chloro-5-(perfluorohexenyloxy)benzene, 1,3-diamino-4-bromo-5-(perfluorohexenyloxy)benzene, 1,2-diamino-4-(perfluorohexenyloxy)benzene, 1,2-diamino-4-methyl-5-(perfluorohexenyloxy)benzene, 1,2-diamino-4-methoxy-5-(perfluorohexenyloxy)benzene, 1,2-diamino-3,4,6-trifluoro-5-(perfluorohexenyloxy)benzene, 1,2-diamino-4-chloro-5-(perfluorohexenyloxy)benzene, 1,2-diamino-4-bromo-5-(perfluorohexenyloxy)benzene, 1,4-diamino-3-(perfluorohexenyloxy)benzene, 1,4-diamino-2-methyl-5-(perfluorohexenyloxy)benzene, 1,4-diamino-2-methoxy-5-(perfluorohexenyloxy)benzene, 1,4-diamino-2,3,6-trifluoro-5-(perfluorohexenyloxy)benzene, 1,4-diamino-2-chloro-5-(perfluorohexenyloxy)benzene, and 1,4-diamino-2-bromo-5-(perfluorohexenyloxy)benzene. Two or more of these may be used in the form of a mixture.

As examples of the diamine having no fluorine, it may include p-phenylenediamine, m-phenylenediamine, 2,6-diaminopyridine, 1,5-diaminonaphthalene, 2,6-diaminonaphthalene, benzidine, 3,3'-dimethylbenzidine, 3,3'-dimethoxybenzidine, 3,3'-diaminobenzophenone, 3,3'-dimethyl-4,41-diaminobenzophenone, 3,3'-dimethoxy-4,4'-diaminobenzophenone, 3,3'-diethoxy-4,4'-diaminobenzophenone, 3,3'-dichloro-4,4'-diaminobenzophenone, 3,3'-dibromo-4,4'-diaminobenzophenone, 3,3'5,5'-tetramethyl-4,4'-diaminobenzophenone, 3,3'5,5'-tetramethoxy-4,4'-diaminobenzophenone, 3,3'5,5'-tetraethoxy-4,4'-diaminobenzophenone, 3,3'5,5'-tetrachloro-4,4'-diaminobenzophenone, 3,3'5,5'-tetrabromo-4,4'-diaminobenzophenone, 4,4'-diaminodiphenyl ether, 3,4'-diaminodiphenyl ether, 3,3'-diaminodiphenyl ether, 3,3'-dimethyl-4,4'-diaminodiphenyl ether, 3,3'-diisopropyl-4,4'-diaminodiphenyl ether, 3,3'-dimethoxy-4,4'-diaminodiphenyl ether, 3,3'-diethoxy-4,4'-diaminodiphenyl ether, 3,3'-dichloro-4,4'-diaminodiphenyl ether, 3,3'-dibromo-4,4'-diaminodiphenyl ether, 3,3',5,5'-tetramethyl-4,4'-diaminodiphenyl ether, 3,3',5,5'-tetraethyl-4,4'-diaminodiphenyl ether, 3,3',5,5'-tetramethoxy-4,4'-diaminodiphenyl ether, 3,3',5,5'-tetraethoxy-4,4'-diaminodiphenyl ether, 3,3',5,5'-tetrachloro-4,4'-diaminodiphenyl ether, 3,3',5,5'-tetrabromo-4,4'-diaminodiphenyl ether, 3,3'-diisopropyl-5,5'-dimethyl-4,4'-diaminodiphenyl ether, 3,3'-diisopropyl-5,5'-diethyl-4,4'-diaminodiphenyl ether, 4,4'-diaminodiphenylmethane, 3,3'-diaminodiphenylmethane, 3,3'-dimethyl-4,4'-diaminodiphenylmethane, 3,3'-diethyl-4,4'-diaminodiphenylmethane, 3,3'-dimethoxy-4,4'-diaminodiphenylmethane, 3,3'-diethoxy-4,4'-diaminodiphenylmethane, 3,3'-dichloro-4,4'-diaminodiphenylmethane, 3,3'-dibromo-4,4'-diaminodiphenylmethane, 3,3',5,5'-tetramethyl-4,4'-diaminodiphenylmethane, 3,3',5,5'-tetraisopropyl-4,4'-diaminodiphenylmethane, 3,3',5,5'- tetramethoxy-4,4'-diaminodiphenylmethane, 3,3',5,5'-tetraethoxy-4,4'-diaminodiphenylmethane, 3,3',5,5'-tetrachloro-4,4'-diaminodiphenylmethane, 3,3',5,5'-tetrabromo-4,4'-diaminodiphenylmethane, 3,3',5,5'-tetraisopropyl-4,4'-diaminodiphenylmethane, 3,3'-diisopropyl-5,5'-dimethyl-4,4'-diaminodiphenylmethane, 3,3'-diisopropyl-5,5'-diethyl-4,4'-diaminodiphenylmethane, 4,4'-diaminodiphenylpropane, 3,3'-diaminodiphenylpropane, 3,3'-dimethyl-4,4'-diaminodiphenylpropane, 3,3'-dimethoxy-4,4'-diaminodiphenylpropane, 3,3'-diethoxy-4,4'-diaminodiphenylpropane, 3,3'-dichloro-4,4'-diaminodiphenylpropane, 3,3'-dibromo-4,4'-diaminodiphenylpropane, 3,3',5,5'-tetramethyl-4,4'-diaminodiphenylpropane, 3,3',5,5'-tetramethoxy-4,4'-diaminodiphenylpropane, 3,3',5,5'-tetraethoxy-4,4'-diaminodiphenylpropane, 3,3',5,5'-tetrachloro-4,4'-diaminodiphenylpropane, 3,3',5,5'-tetrabromo-4,4'-diaminodiphenylpropane, 3,3'-diisopropyl-5,5'-dimethyl-4,4'-diaminodiphenylpropane, 3,3'-diisopropyl-5,5'-diethyl-4,4'-diaminodiphenylpropane, 4,4'-diaminodiphenylsulfone, 3,3'-diaminodiphenylsulfone, 3,3'-dimethyl-4,4'-diaminodiphenylsulfone, 3,3'-dimethoxy-4,4'-diaminodiphenylsulfone, 3,3'-diethoxy-4,4'-diaminodiphenylsulfone, 3,3'-dichloro-4,4'-diaminodiphenylsulfone, 3,3'-dibromo-4,4'-diaminodiphenylsulfone, 3,3',5,5'-tetramethyl-4,4'-diaminodiphenylsulfone, 3,3',5,5'-tetramethoxy-4,4'-diaminodiphenylsulfone, 3,3',5,5'-tetraethoxy-4,4'-diaminodiphenylsulfone, 3,3',5,5'-tetrachloro-4,4'-diaminodiphenylsulfone, 3,3',5,5'-tetrabromo-4,4'-diaminodiphenylsulfone, 3,3'-diisopropyl-5,5'-dimethyl-4,4'-diaminodiphenylsulfone, 3,3'-diisopropyl-5,5'-diethyl-4,4'-diaminodiphenylsulfone, 4,4'-diaminodiphenyl sulfide, 3,3'-diaminodiphenyl sulfide, 3,3'-dimethyl-4,4'-diaminodiphenyl sulfide, 3,3'-dimethoxy-4,4'-diaminodiphenyl sulfide, 3,3'-diethoxy-4,4'-diaminodiphenyl sulfide, 3,3'-dichloro-4,4'-diaminodiphenyl sulfide, 3,3'-dibromo-4,4'-diaminodiphenyl sulfide, 3,3',5,5'-tetramethyl-4,4'-diaminodiphenyl sulfide, 3,3',5,5'-tetramethoxy-4,4'-diaminodiphenyl sulfide, 3,3',5,5'-tetraethoxy-4,4'-diaminodiphenyl sulfide, 3,3',5,5'-tetrachloro-4,4'-diaminodiphenyl sulfide, 3,3',5,5'-tetrabromo-4,4'-diaminodiphenyl sulfide, 1,4-bis(4-aminophenoxy)benzene, 1,3-bis(4-aminophenoxy)benzene, 2,2-bis(4-aminophenoxyphenyl)propane, bis(4-aminophenoxyphenyl)sulfone, bis(4-aminophenoxyphenyl)sulfide, bis(4-aminophenoxyphenyl)biphenyl, 4,4'-diaminodiphenyl ether-3-sulfonamide, 3,4'-diaminodiphenyl ether-4-sulfonamide, 3,4'-diaminodiphenyl ether-3'-sulfonamide, 3,3'-diaminodiphenyl ether-4-sulfonamide, 4,4'-diaminodiphenylmethane-3-sulfonamide, 3,4'-diaminodiphenylmethane-4-sulfonamide, 3,4'-diaminodiphenylmethane-3'-sulfonamide, 3,3'-diaminodiphenylmethane-4-sulfonamide, 4,4'-diaminodiphenylsulfone-3-sulfonamide, 3,4'-diaminodiphenylsulfone-4-sulfonamide, 3,4'-diaminodiphenylsulfone-3'-sulfonamide, 3,3'-diaminodiphenylsulfone-4-sulfonamide, 4,4'-diaminodiphenyl sulfide-3-sulfonamide, 3,4'-diaminodiphenyl sulfide-4-sulfonamide, 3,3'-diaminodiphenyl sulfide-4-sulfonamide, 3,4'-diaminodiphenyl sulfide-3'-sulfonamide, 1,4-diaminobenzene-2-sulfonamide, 4,4'-diaminodiphenyl ether-3-carbonamide, 3,4'-diaminodiphenyl ether-4-carbonamide, 3,4'-diaminodiphenyl ether-3'-carbonamide, 3,3'-diaminodiphenyl ether-4-carbonamide, 3,3'-diaminodiphenyl ether-4-carbonamide, 4,4'-diaminodiphenylmethane-3-carbonamide, 3,4'-diaminodiphenylmethane-4-carbonamide, 3,4'-diaminodiphenylmethane-3'-carbonamide, 3,3'-diaminodiphenylmethane-4-carbonamide, 4,4'-diaminodiphenylsulfone-3-carbonamide, 3,4'-diaminodiphenylsulfone-4-carbonamide, 3,4'-diaminodiphenylsulfone-3'-carbonamide, 3,3'-diaminodiphenylsulfone-4-carbonamide, 4,4'-diaminodiphenyl sulfide-3-carbonamide, 3,4'-diaminodiphenyl sulfide-4-carbonamide, 3,3'-diaminodiphenyl sulfide-4-carbonamide, 3,4'-diaminodiphenyl sulfide-3'-carbonamide, 1,4-diaminobenzene-2-carbonamide, 4-aminophenyl-3-aminobenzoic acid, 2,2-bis(4-aminophenyl)propane, bis(4-aminophenyl)diethylsilane, bis(4-aminophenyl)diphenylsilane, bis(4-aminophenyl)ethylphosphine oxide, bis(4-aminophenyl)-N-butylamine, bis(4-aminophenyl)-N-methylamine, N-(3-aminophenyl)-4-aminobenzamide, 2,4-bis(β-amino-t-butyl)toluene, bis(p-β-amino-t-butylphenyl) ether, bis(p-β-amino-γ-aminopentyl) benzene, bis-p-(1,1-dimethyl-5-aminopentyl)benzene, hexamethylenediamine, heptamethylenediamine, octamethylenediamine, nonamethylenediamine, decamethylenediamine, tetramethylenediamine, propylenediamine, 3-methylheptamethylenediamine, 4,4'-dimethylheptamethylenediamine, 2,11-diaminododecane, 1,2-bis-(3-aminopropoxy)ethane, 2,2-dimethylpropylenediamine, 3-methoxy-hexamethylenediamine, 2,5-dimethylhexamethylenediamine, 2,5-dimethylheptamethylenediamine, 5-methylnonamethylenediamine, 2,17-diaminoicosadecane, 1,4-diaminocyclohexane, 1,10-diamino-1,10-dimethyldecane, and 1,12-diaminooctadecane. Two or more of these may be used in the form of a mixture.

As a part of the diamine, a silicon diamine may be used. The silicon diamine includes 1,3-bis(3-aminopropyl)-1,1,1-tetraphenyldisiloxane, 1,3-bis(3-aminopropyl)-1,1,1-tetramethyldisloxane, and 1,3-bis(4-aminobutyl)-1,1,1-tetramethyldisloxane. In the case when the silicon diamine is used, any of these may preferably be used in an amount of from 0.1 to 10 mol % based on the total weight of the diamine. The above tetracarboxylic dianhydride and the diamine may each be used in combination of two or more. As the precursor solutions of the polyimide type resins, those having sensitivity may also be used.

In First and Second Embodiments, the second coupler layer 23 may preferably have a thickness of 10 μm or less. If it has a thickness of more than 10 μm, the whole resin films of the second coupler layer 23 and polyimide type resin films having fluorine (layers of from the lower clad layer 3 up to the protective layer 9) have so large a thickness as to cause awarpagedue to a stress coming from a difference in coefficient of expansion between the films and the substrate. The uniformity of thickness of the whole resin films may also be achieved with difficulty. In particular, the second coupler layer 23 may more have a thickness of 1.0 μm or less. The thickness of the second coupler layer 23 must optimally be selected in accordance with the structure of the optical waveguide formed thereon which is produced using the polyimide type resin films having fluorine (layers of from the lower clad layer 3 up to the protective layer 9). More specifically, where an optical-waveguide multi-layer member is formed in which the top of the second coupler layer 23 is directly provided with a core (the optical waveguide 4) or where an optical-waveguide multi-layer member is formed which is so made up that the second coupler layer 23 and the optical waveguide 4 stand in proximity (i.e., the clad layer 3 positioned between the second coupler layer 23 and the optical waveguide 4 has a small thickness), the second coupler layer 23 can be a factor of great light loss. Accordingly, the second coupler layer 23 may preferably be formed in a small thickness. Specific thickness should be determined taking account of the refractive indices and respective heights, widths and so forth of the substrate 1, the second coupler layer 23 formed of polyimide type resin having no fluorine, the clad layers 3 and 5 formed using polyimide type resin having fluorine and the optical waveguide 4. In general, taking account of the matching with optical fibers which are transmission paths, and in order to well reduce any loss for the light being propagated within that waveguide 4 because the optical waveguide 4 formed of polyimide type resin having fluorine is formed in a size of about 10 μm in many cases, the second coupler layer 23 may preferably be formed in a thickness of 1/10 or less of the size of the optical waveguide 4. In the case of the above example, it may more preferably be formed in a thickness of 1.0 μm or less, and still more preferably 0.5 μm or less.

As the polyimide precursor solution used to form the second coupler layer 23 in First and Second Embodiments, a solution prepared in the following way may also be used. That is, it is a solution obtained by dissolving 35.33 g of 4,4'-diaminodiphenyl ether and 4.77 g of 4,4'-diaminodiphenyl ether-3-carbonamide in 28.3 g of N-methyl-2-pyrrolidone, and thereafter adding 31.69 g of 3,3',4,4'-benzophenonetetracarboxylic dianhydride and 21.44 g of pyrotrimellitic dianhydride, followed by stirring at room temperature for 6 hours.

As the precursor solution used to form in First and Second Embodiments the polyimide layers having fluorine which constitute the layers of from the lower clad layer 3 up to the protective layer 9, a solution prepared in the following way may be used. That is, it is a solution obtained by dissolving 1.47 g of 2,2-bis(4-aminophenyl)hexafluoropropane in 450 g of N,N-dimethylacetamide, and thereafter adding 28.53 g of 2,2'-bis(3.4-dicarboxyphenyl)hexafluoropropane dianhydride, followed by stirring at room temperature for 20 hours.

In First and Second Embodiments, as the second coupler layer 23, a polyimide silicone resin may also be used which has Si atoms in the molecular structure and has a strong self-adherence to silicon or $SiO_2$. An acrylic resin having no fluorine or a polycarbonate type resin having no fluorine may also be used as the resin of the second coupler layer 23.

As the polyimide silicone resin, usable is a polymerization product of a benzophenonetetracarboxylic dianhydride (BTDA), methylenedianiline (MDA) and bis-γ-aminopropyltetramethyldisiloxane (GAPD), which is represented by the structural formula:

As the resin constituting the clad layers 3 and 5, the following fluorinated polyimide A may be used. The fluorinated polyimide A is a polymerization product of a 2,2'-bis (trifluoromethyl)-4,4'-diaminobiphenyl (TFDB) and 2,2'-bis (3,4-dicarboxyphenyl)hexafluoropropane dianhydride (6FDA), which is represented by the structural formula:

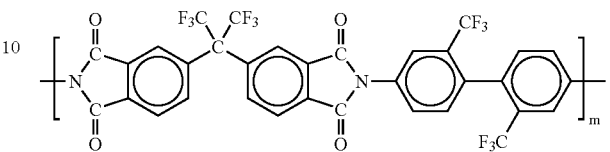

Also, as the resin constituting the optical waveguide 4, the following fluorinated polyimide resin B may be used. The fluorinated polyimide resin B is a polymerization product of TFDB, 6FDA and pyromellitic dianhydride (PMDA), which is represented by the structural formula:

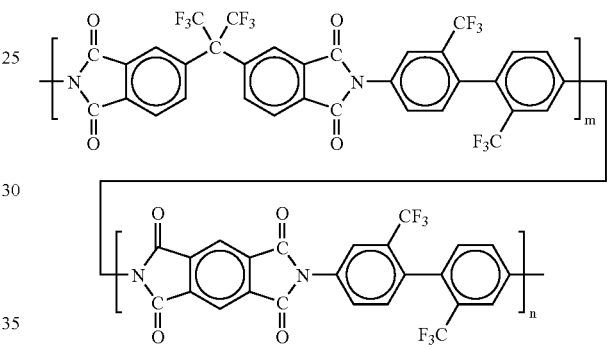

The 6FDA and the TFDB may be used in a proportion (i.e., proportion of m to n) of 4:1 so that the refractive index of the optical waveguide 4 is larger by about 0.3% than the refractive index of the clad layers 3 and 5.

As having been described above, the present invention can provide an optical element production process that can remove films in recesses with ease in the step of producing optical elements making use of a substrate having recesses.

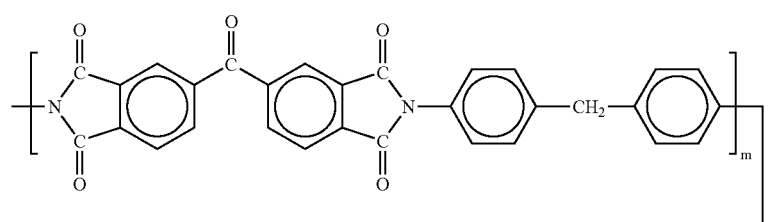

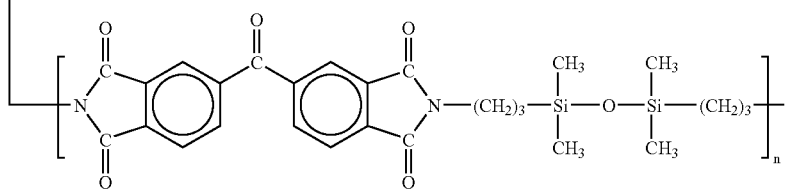

What is claimed is:

1. An optical element comprising a substrate, and disposed on the substrate an optical-waveguide structure layer made of a resin, wherein:
   said optical-waveguide structure layer comprises an optical waveguide and a clad layer,
   an organozirconium compound layer is provided as a coupler layer between said substrate and said optical-waveguide structure layer,
   said organozirconium compound layer has, in a region beneath said optical waveguide, a film thickness distribution in the range of from a minimum film thickness of 50 angstroms or more to a maximum film thickness of 150 angstroms or less,
   said optical-waveguide structure layer is disposed on a first region of said substrate; and
   a recess is formed in a second region of said substrate, where said optical-waveguide structure layer is not disposed on said substrate.

2. The optical element according to claim 1, wherein said optical-waveguide structure layer is formed of a resin material containing fluorine, and a resin layer containing no fluorine is disposed between said coupler layer and said optical-waveguide structure layer.

3. The optical element according to claim 1 wherein said substrate has a registration mark.

4. The optical element according to claim 1, wherein said recess is for mounting an optical fiber.

5. The optical element according to claim 1, wherein said coupler layer is a first coupler layer, and wherein the optical element includes a second coupler layer, wherein the second coupler layer contains no organometallic compound.

6. The optical element according to claim 5, wherein said second coupler layer is positioned between the first coupler layer and the optical-waveguide structure layer.

7. The optical element according to claim 5, wherein said second coupler layer is a polyimide resin film containing no fluorine.

8. An optical element comprising a substrate; an optical waveguide made of a resin, mounted on the substrate at its some part; a groove provided in a region of a top surface of the substrate in which region the optical waveguide is not mounted; and an electrode provided in a region of the top surface of the substrate in which region the optical waveguide is not mounted, wherein
   an organozirconium compound layer is disposed as a coupler layer between said substrate and said optical waveguide,
   said organozirconium compound layer has, in a region beneath said optical waveguide, a film thickness distribution in the range of from a minimum film thickness of 50 angstroms or more to a maximum film thickness of 150 angstroms or less, and
   a recess formed together with said groove in the step of forming said groove, is disposed around said electrode.

9. The optical element according to claim 8, wherein said optical-waveguide structure layer is formed of a resin material containing fluorine, and a resin layer containing no fluorine is disposed between said coupler layer and said optical-waveguide structure layer.

10. The optical element according to claim 8, wherein said recess is for mounting an optical fiber.

* * * * *

UNITED STATES PATENT AND TRADEMARK OFFICE
CERTIFICATE OF CORRECTION

| | |
|---|---|
| PATENT NO. | : 7,139,460 B2 |
| APPLICATION NO. | : 10/479150 |
| DATED | : November 21, 2006 |
| INVENTOR(S) | : T. Kuroda et al. |

It is certified that error appears in the above-identified patent and that said Letters Patent is hereby corrected as shown below:

Title Page, item (87) PCT Pub. Date: delete "Dec. 5, 2003" and insert --Dec. 5, 2002--.

Signed and Sealed this

Twelfth Day of June, 2007

JON W. DUDAS
*Director of the United States Patent and Trademark Office*